US012184950B2

(12) United States Patent
Ramsing et al.

(10) Patent No.: US 12,184,950 B2
(45) Date of Patent: Dec. 31, 2024

(54) CONFIGURABLE PERSONALIZED REMOTE CONTROL

(71) Applicant: CARITY APS, Aarhus C (DK)

(72) Inventors: Niels Birger Ramsing, Egå (DK); Kristoffer Rye Andersen Geer, Højbjerg (DK); Mikael Christian Hartoft Andersen, Åbyhøj (DK); Christian Overgaard Rasmussen, Aarhus C (DK); Jens Kristian Ellekilde Gundersen, Knebel (DK)

(73) Assignee: CARITY APS, Aarhus C (DK)

( * ) Notice: Subject to any disclaimer, the term of this patent is extended or adjusted under 35 U.S.C. 154(b) by 268 days.

(21) Appl. No.: 17/783,974

(22) PCT Filed: Dec. 14, 2020

(86) PCT No.: PCT/EP2020/085977
§ 371 (c)(1),
(2) Date: Jun. 9, 2022

(87) PCT Pub. No.: WO2021/116492
PCT Pub. Date: Jun. 17, 2021

(65) Prior Publication Data
US 2022/0417616 A1    Dec. 29, 2022

(30) Foreign Application Priority Data

Dec. 13, 2019  (EP) .................................... 19216124
Jun. 25, 2020  (EP) .................................... 20182221

(51) Int. Cl.
*H04N 21/422*  (2011.01)
*G06F 3/0362*  (2013.01)
(Continued)

(52) U.S. Cl.
CPC ....... *H04N 21/8153* (2013.01); *G06F 3/0362* (2013.01); *G06F 3/04815* (2013.01);
(Continued)

(58) Field of Classification Search
CPC ....... H04N 21/42204; H04N 21/42206; H04N 21/42222; H04N 21/4222;
(Continued)

(56) References Cited

U.S. PATENT DOCUMENTS 9,715,242 B2  7/2017  Pillai et al.
9,866,507 B2  1/2018  Frenkel et al.
(Continued)

FOREIGN PATENT DOCUMENTS

EP    3222207 A1    9/2017
EP    3297218 A1    3/2018
(Continued)

*Primary Examiner* — Sherrie Hsia
(74) *Attorney, Agent, or Firm* — Dinsmore & Shohl LLP

(57) ABSTRACT

A personalized remote control is configured such that a predefined movement and/or orientation of the remote control is associated with a predefined command. The remote control includes a plurality of output surfaces configured for controlling digital content on one or more output devices, such that each of the output surfaces is associated with a predefined selection of digital content. The remote control provides a simple interface for controlling a number of electronic devices. Preferably, elderly people and/or people with dementia should be able to operate/interact with the remote control. The remote control is typically part of a system comprising a database with personal content of the user, an electronic device receiving commands from the remote control, and one or more electronic output devices controllable by the remote control.

19 Claims, 10 Drawing Sheets

(51) Int. Cl.
*G06F 3/04815* (2022.01)
*H04N 21/81* (2011.01)

(52) U.S. Cl.
CPC . *H04N 21/42221* (2013.01); *H04N 21/42222* (2013.01); *G06F 2203/04802* (2013.01)

(58) Field of Classification Search
CPC ....... H04N 21/42224; H04N 21/42225; H04N 21/42226; H04N 21/42228; H04N 21/4227; H04N 21/8153; H04N 21/42221; H04N 21/422; G06F 3/0362; G06F 3/04815; G06F 2203/04802; G08C 2201/32; G08C 17/02
USPC ......................................................... 348/734
See application file for complete search history.

(56) References Cited

U.S. PATENT DOCUMENTS

| | | | |
|---|---|---|---|
| 10,034,979 | B2 | 7/2018 | Bechtel et al. |
| 2009/0103898 | A1 | 4/2009 | Morioka et al. |
| 2009/0322552 | A1* | 12/2009 | Machimura ...... H04N 21/42204 348/734 |
| 2010/0094157 | A1 | 4/2010 | Kummer |
| 2012/0162539 | A1 | 6/2012 | Muramatsu et al. |
| 2012/0323090 | A1 | 12/2012 | Bechtel et al. |
| 2013/0079903 | A1 | 3/2013 | Kemmann et al. |
| 2014/0067130 | A1 | 3/2014 | Pillai et al. |
| 2014/0074855 | A1 | 3/2014 | Zhao et al. |
| 2014/0285400 | A1 | 9/2014 | Sato et al. |
| 2015/0290419 | A1 | 10/2015 | Kare et al. |
| 2015/0294086 | A1 | 10/2015 | Kare et al. |
| 2015/0320588 | A1 | 11/2015 | Connor |
| 2016/0314255 | A1 | 10/2016 | Cook et al. |
| 2018/0186234 | A1 | 7/2018 | Mestha et al. |
| 2018/0342329 | A1 | 11/2018 | Rufo et al. |
| 2019/0050070 | A1 | 2/2019 | Su |

FOREIGN PATENT DOCUMENTS

| | | |
|---|---|---|
| GB | 2533389 A | 6/2016 |
| JP | 2015065585 A | 4/2015 |
| WO | 2010/023633 A1 | 3/2010 |
| WO | 2014/036133 A1 | 3/2014 |
| WO | 2018/039433 A1 | 3/2018 |
| WO | 2019/092120 A1 | 5/2019 |
| WO | 2019/122413 A1 | 6/2019 |

\* cited by examiner

CONFIGURABLE PERSONALIZED REMOTE CONTROL

CROSS-REFERENCE TO RELATED APPLICATIONS

This application is the U.S. National Stage of PCT/EP2020/075854 filed on Sep. 16, 2020, which claims priority to European Patent Application 19197740.4 filed on Sep. 17, 2019, the entire content of both are incorporated herein by reference in their entirety.

FIELD OF THE INVENTION

The present disclosure relates to a personalized remote control configured such that a predefined movement and/or orientation of the remote control is associated with a predefined command. The remote control comprises a plurality of output surfaces configured for controlling digital content on one or more output devices, such that each of said output surfaces is associated with a predefined selection of digital content.

BACKGROUND OF THE INVENTION

Remote controls have existed for decades as a means for operating electronic devices from a distance, usually wirelessly. Early television remote controls (1956-1977) used ultrasonic tones. Present-day remote controls are commonly infrared devices. Remote controls in the 2000s introduced Bluetooth connectivity, motion sensor-enabled capabilities and voice control.

Oftentimes, remote controls comprise a large number of buttons for providing a large number of options. Furthermore, the user often needs to point the remote control at the electronic device that he/she wants to control. This is especially the case for infrared devices, which form a large part of the commonly encountered remote controls.

However, such remote controls with many buttons are difficult to operate for some users such as elderly persons. It is even more difficult for mentally impaired persons such as people diagnosed with dementia. These groups of people typically live in a nursing home, in an assisted living facility, or similar. Here they are taken care of by the nursing home staff and they typically receive visits from friends and relatives. Such visits are often a good occasion to share personal images from e.g. vacations and travels, or display images or videos of grandchildren, etc. Today, there are various devices and systems for sharing such digital content, e.g. smart TVs, Chromecast, etc. However, many of these systems are too difficult for the elderly to operate.

Therefore, there is a need of a remote control that provides an easy-to-use interface between a user and one or more electronic devices. Furthermore, there is a need of a remote control that can be used by mentally impaired people, e.g. people with dementia.

SUMMARY OF THE INVENTION

The present disclosure addresses the above-mentioned needs by providing a remote control constituting a simple physical interface that may be operated by elderly people.

In a first aspect, the present disclosure relates to a remote control for wirelessly controlling digital content on one or more output devices. It further relates to a method for controlling, via said remote control, one or more output devices in the environment of a person. Said output devices may include displays, sound systems, aroma systems, lighting systems, or temperature control systems. The remote control preferably constitutes a simple interface between a user and one or more output devices, such that it may be operated by elderly people and even mentally impaired persons, e.g. individuals suffering from dementia. Furthermore, the remote control preferably comprises means for controlling the playback of digital content on an output device such as a display, a TV, a sound system, or similar. In order for the remote control to provide an alternative that is easy to operate compared to common remote controls, it should preferably be possible to interact with the remote control entirely through one or more actions interpretable by the device. In some embodiments, the remote control is configured such that a user can control the playback of digital content on an output device entirely through movements (e.g. rotations) of the remote control.

The presently disclosed remote control provides many advantages over existing remote controls. First, it is possible to control multiple output devices solely by handling the remote control, i.e. without pressing any buttons on the remote control. In a preferred embodiment, the remote control may be used to control digital content on one or more devices simply by rotating the remote control such that an output surface of the remote control points in a predefined direction. Thus, the presently disclosed remote control obviates the need for buttons to control digital media. This makes the device more intuitive to use, which makes it ideal for the elderly or people with dementia. However, the remote control may comprise a few buttons, such as a single button e.g. with the purpose of enabling a user to grade the digital media being presented. A second advantage is that the remote control may be reconfigured by the user, a caretaker, or a relative. Preferably, the remote control comprises a plurality of flat polygonal surfaces, wherein a subset of said surfaces are configured as output surfaces, each of said output surfaces being associated with a specific digital collection, such that e.g. a presentation comprising content from said digital collection may be displayed on a nearby screen by orienting the output surface associated with said collection in a predefined direction. Preferably the output surfaces may be labelled with a personal image, a drawing, an icon, a text, or combinations thereof, that represent the associated digital collection to facilitate use. The remote control may be reconfigured such that the output surfaces are associated with new digital content, which may include changing the image displayed on the associated surfaces. This reconfiguration may be done manually or automatically by the system. Hence, the presently disclosed remote control is a highly dynamic device that may be reconfigured during the lifetime of the product. Furthermore, the remote control may be adapted to control many different devices such as TVs, tablets, electronic displays, sound systems, etc., whereas common remote controls are typically only capable of controlling one device or one system. A third advantage of the present disclosure is that the system may automatically generate new personalized presentations comprising a variety of digital content (e.g. images, videos, sounds, etc.) on a plurality of output devices. The presentations may be generated automatically using an artificial intelligence algorithm, which selects the content based on e.g. user preferences, user behaviour, uploads from the user, or combinations thereof.

In a second aspect, the present disclosure relates to a method for adapting the environment of an individual, such as a person diagnosed with dementia. The method described herein has a number of advantages over existing approaches for enhancing the well-being of persons with dementia. First, the method allows friends and relatives to the person to share personal digital collections, which may be formed either manually or automatically based on uploaded digital content from said relatives. Hence, the environment may be personalized based on content from the person's own life and relatives may continuously add new content to the system, such that new digital collections are easily formed. The system may then automatically generate presentations comprising content from said digital collections. Second, the method utilizes a machine learning technique, which determines a quantifiable measure of the person's well-being based on real-time obtained data pertaining to the person. Accordingly, the environment may be continuously adapted in response to the person's well-being in order to maximize the well-being of the person. The remote control according to the first aspect may be used in connection with the method described in the second aspect.

DEFINITIONS

Digital content is understood as any content that exists in the form of digital data. Examples include video, audio, images, and/or combinations thereof. It can also include additional sensory input that can be generated based on digital data, such as vibrations, ambient lighting, olfactory stimuli etc. In the present context, the terms digital content and digital media are used interchangeably.

Figure 6A:
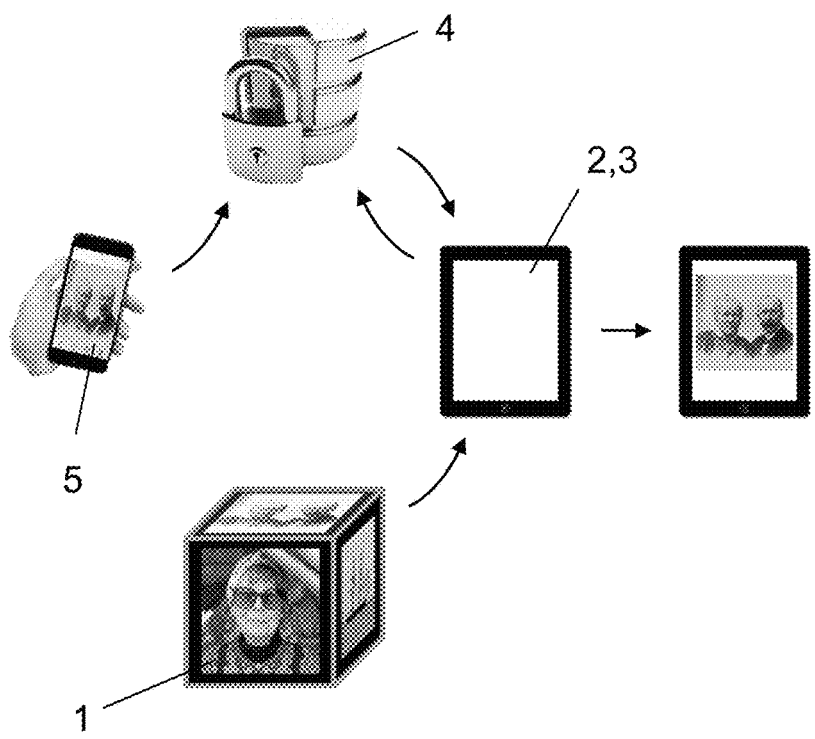
FIG. 6A shows a schematic of one example of how to use the remote control 1 to display an image or a presentation of images on an output device 3, (here exemplified as a tablet). A user may upload digital content such as personal images to a database 4. Once the electronic device 2 (here exemplified as a tablet) receives a command from the remote control 1, the requested content is retrieved from the database 4 and subsequently used in a presentation, which is displayed on the screen of the output device 3. The database 4 may be a cloud-based service, a local server, or an integral part of the electronic device 2.
Figure 6B:
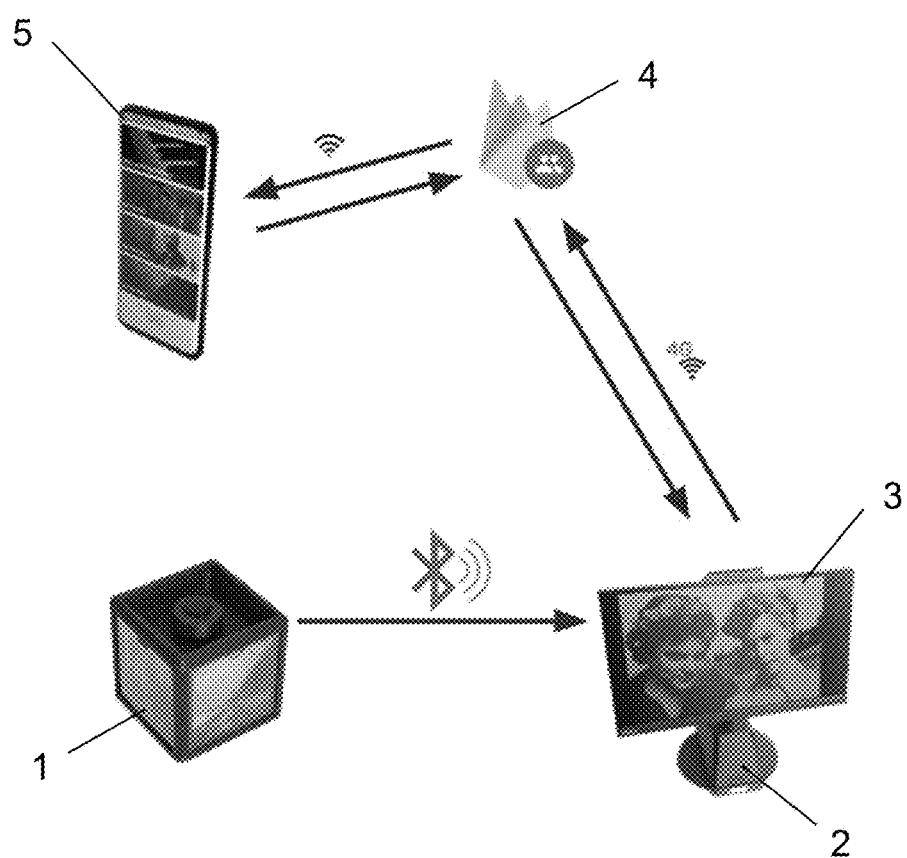
FIG. 6B shows an embodiment of a system configured for controlling digital content on an output device according to the present disclosure. In this embodiment, the system comprises a remote control 1 according to the present disclosure, a software application configured to run on a remote device 5 (e.g. a smartphone), a cloud-based database 4, an electronic device 2, and an output device 3 (here a monitor). In this embodiment, the electronic device 2 is embedded in a housing under the monitor. Different symbols for wireless communication technologies are shown next to the arrows for illustrative purposes.
Figure 6C:
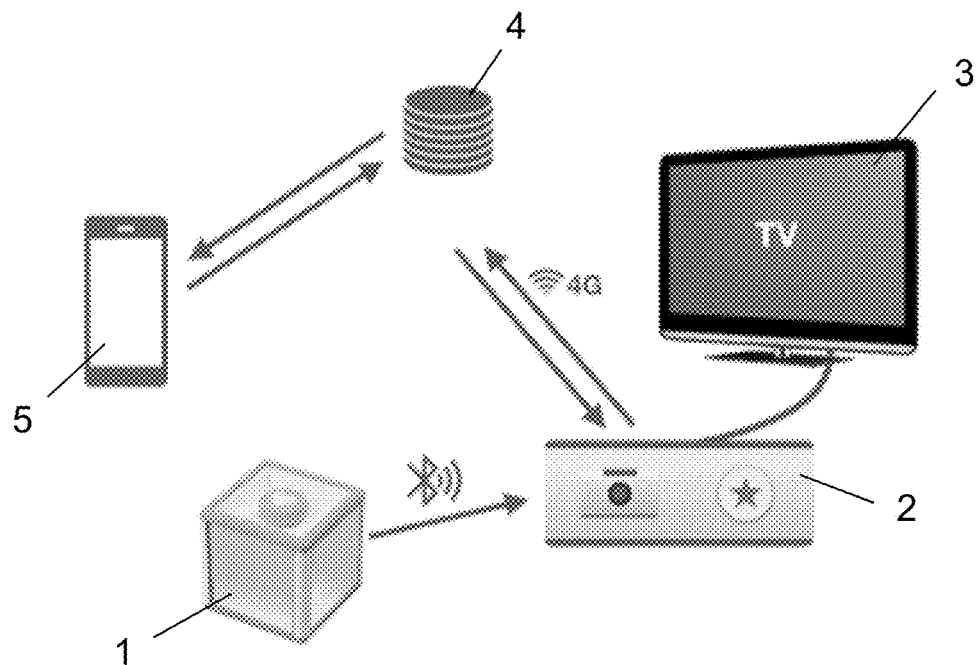
FIG. 6C shows another embodiment of a system configured for controlling digital content on an output device 3 (here exemplified as a television). The system comprises a remote control 1 configured for wireless communication (e.g. via Bluetooth) with an electronic device 2 connected to the output device 3. The electronic device 2 is configured for wireless communication (e.g. via 4G) with a database 4 storing the digital content. A remote device 5 (here exemplified as a smartphone) is configured for wireless communication with the database 4. The symbols for wireless communication are only included as an example; other suitable communication technologies may be used.
Figure 7:
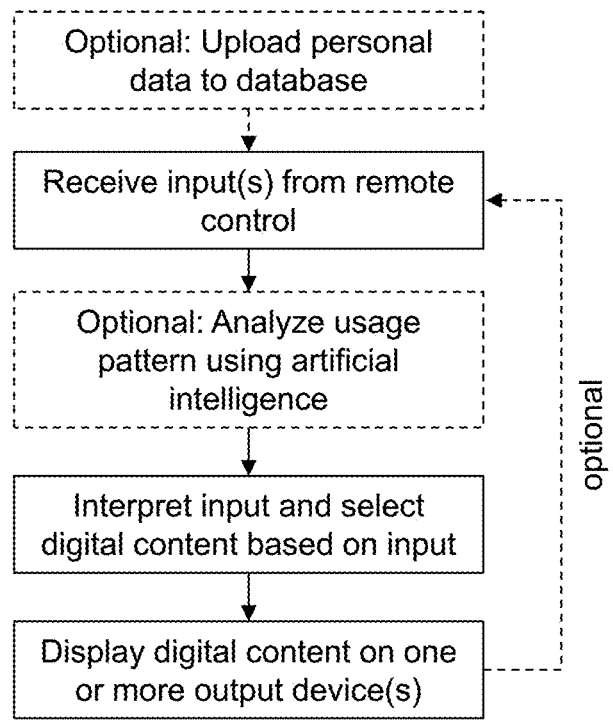
FIG. 7 shows an example of how the remote control may be used to display digital content on one or more output devices.
Figure 8:
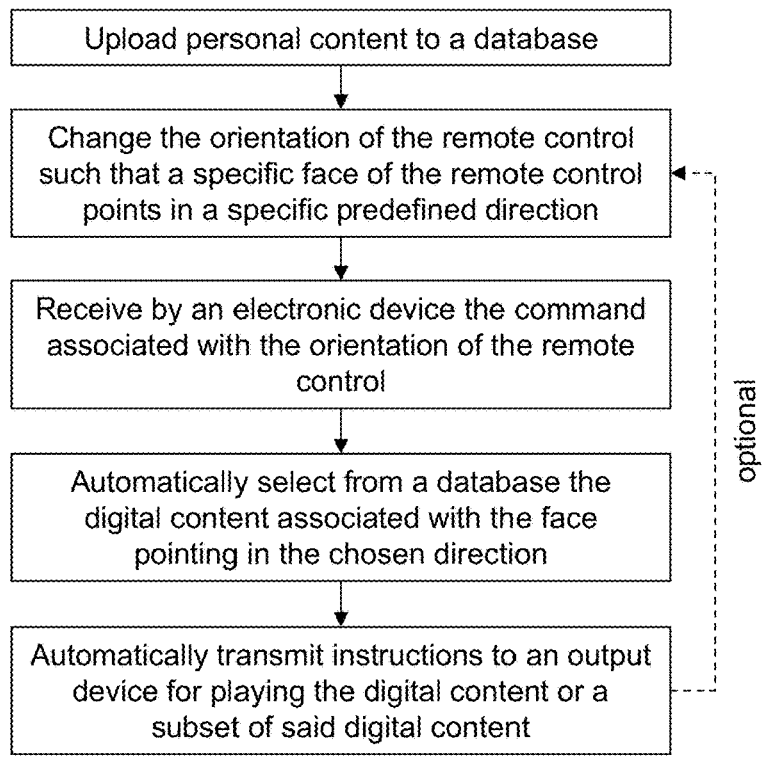
FIG. 8 shows another example of how the remote control may be used to initiate a playback of digital content on one or more output devices by orienting the remote control in predefined direction.
Figure 9:
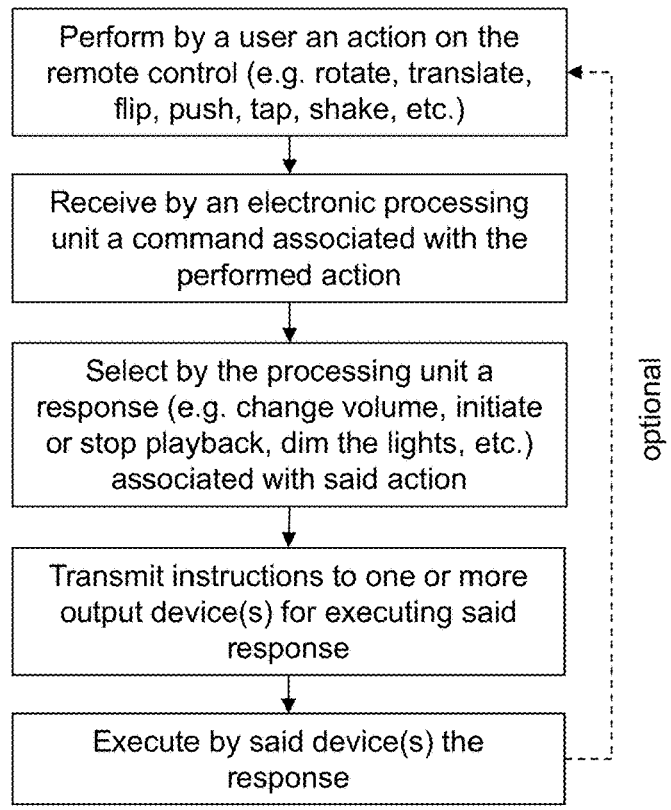
FIG. 9 shows an example of how the remote control may be used to control one or more properties of one or more output devices, e.g. dimming the lights by rotating the remote control counter clockwise.
Figure 10:
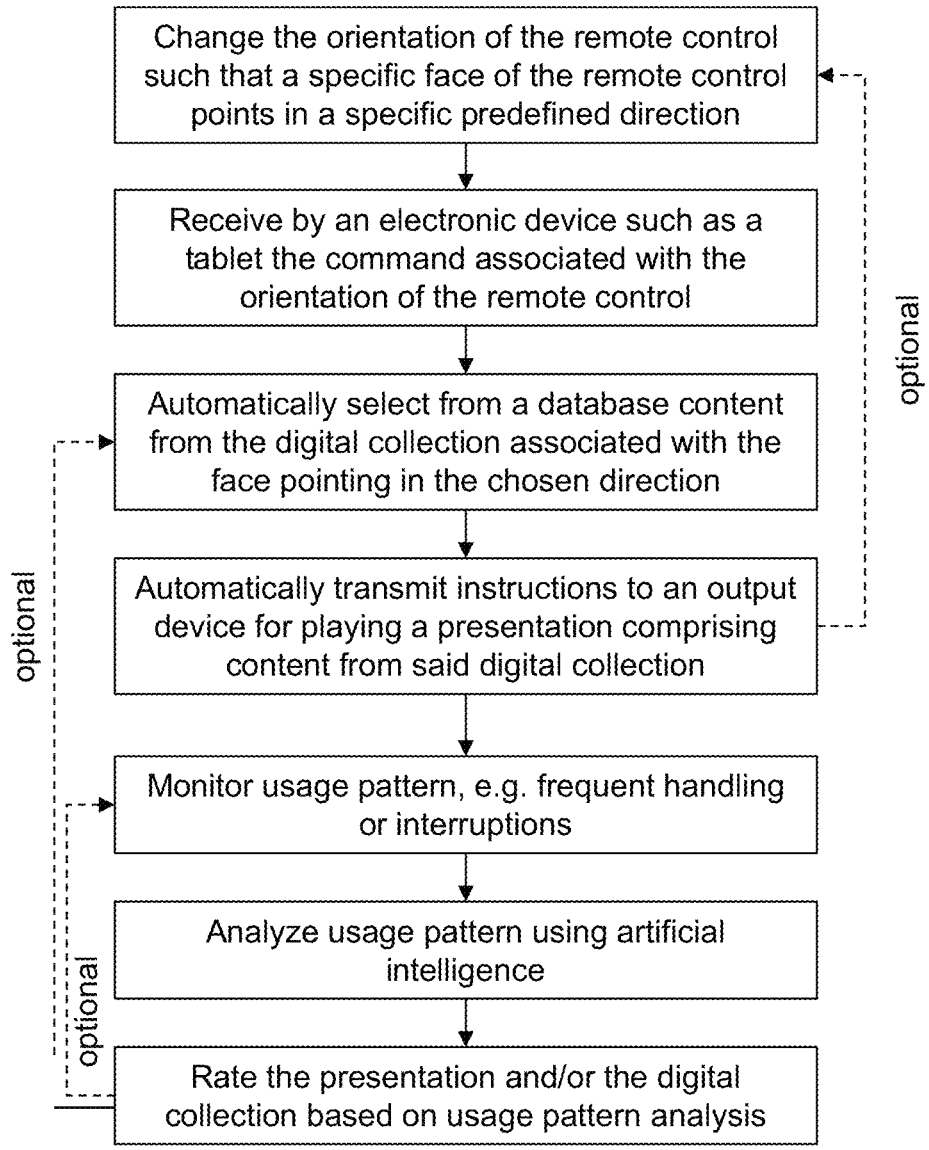
FIG. 10 shows an example of how the usage pattern of the remote control may be monitored and analysed in order to rate the collections of digital content. This may be used to provide customised suggestions on content that the user prefers. The ratings may also be used to improve future presentations, e.g. by generating presentations comprising highly rated content, and/or by changing the duration of the presentation, and/or by varying transitions in the presentation shown to the user.
Figure 11:
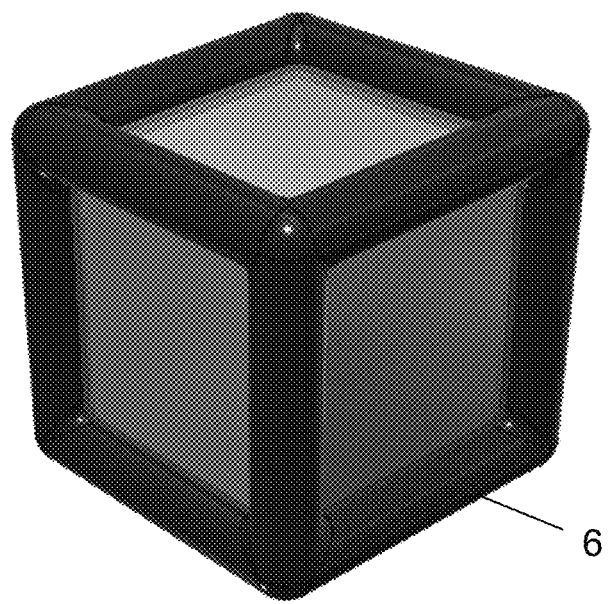
FIG. 11 shows a 3D-illustration of an embodiment of the presently disclosed remote control. This particular embodiment features an elastic frame 6 that acts as a shock absorber. This frame covers the edges of the device.

"The system" in the present context refers to a system comprising the remote control according to the present disclosure and an electronic device configured for receiving commands from the remote control. The system may further comprise one or more output device(s) configured for displaying digital content. The system may further comprise a database and a computer program (e.g. a computer application) for mobile devices to add content and/or configure the system. An example of such a system is shown in FIG. 6B.

An output surface is to be understood as a surface of the remote control that is associated with a selection of digital content to be presented on an output device such as an electronic display, wherein said digital content can be selected by a user action, preferably by orienting the output surface in a predefined direction, e.g. upwards. In general, the remote control comprises a plurality of surfaces, wherein a predefined subset of said surfaces are configured as output surfaces. Some of the surfaces of the remote control may be configured for other purposes than controlling/initiating digital content. As an example, the remote control may comprise a surface with a cover to access batteries or it may comprise a surface with a button. Such a surface (also referred to herein as a control surface) may be used to change the presentation e.g. by changing the sound volume, pausing playback, turning the device of etc.

A static image is to be understood as a visual representation of the digital content associated with the output surface on which the static image is provided, wherein the visual representation does not change in time. The static image may comprise photograph(s), illustration(s), symbol(s), logo(s), text(s), and/or combinations thereof. The term 'static' means that the image does not change in time, i.e. as in the case of a video.

DETAILED DESCRIPTION OF THE INVENTION

In a first aspect, the present disclosure relates to a remote control for wirelessly controlling digital content on one or more output devices. It further relates to a method for controlling, via said remote control, one or more output devices in the environment of a person. The remote control preferably constitutes a simple interface between a user and one or more output devices, such that it may be operated by elderly people and even mentally impaired persons, e.g. individuals suffering from dementia.

Figure 4:
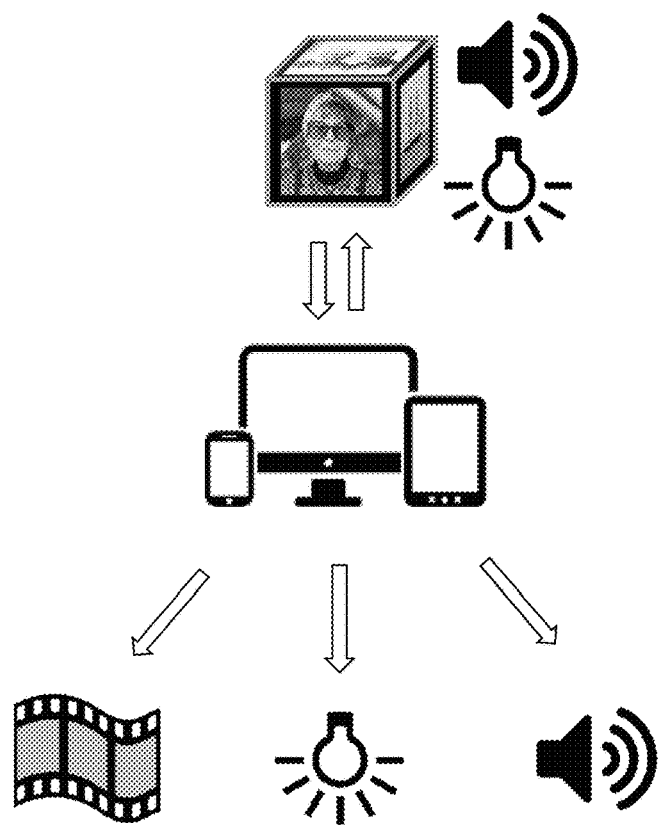
FIG. 4 shows an illustration of how the remote control can be used to control a number of output devices, e.g. for displaying video content, controlling the lights, and/or for playing music or sound. In this embodiment, the remote control transmits commands to an electronic device, e.g. a tablet or a smartphone, which processes the request and relays it to the relevant output devices.
Figure 5:
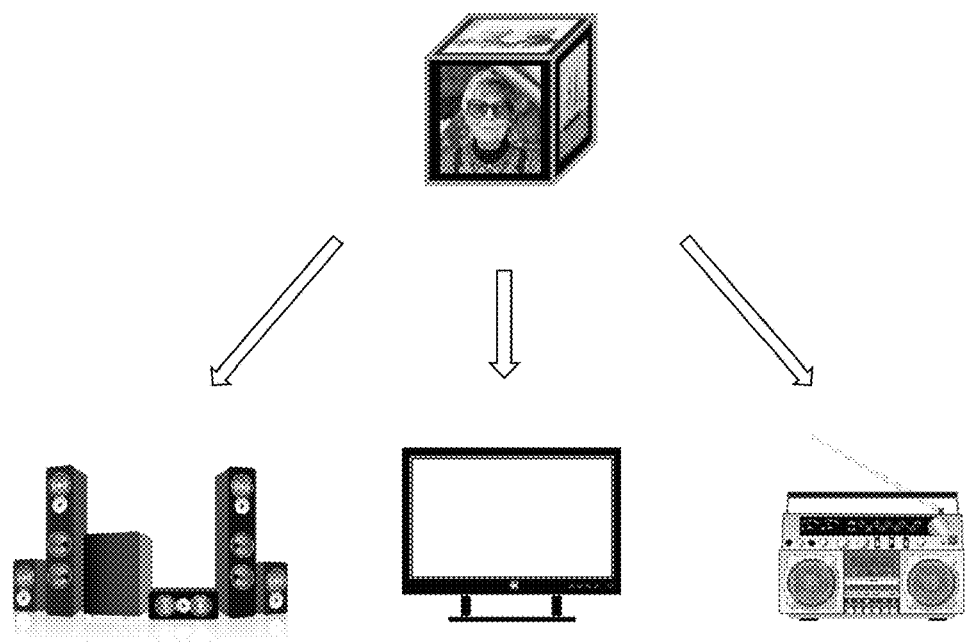
FIG. 5 shows an illustration of how the remote control can be used to control a number of output devices. In this embodiment, the remote control communicates directly with the output devices.

The remote control allows controlling the playback of digital content on an output device such as a display, a TV, a sound system, or similar. It may further be able to control a range of systems such as lighting systems, temperature control systems, aroma systems, audio systems, AV systems, or other systems (see FIG. 4-5). In order for the remote control to provide an alternative that is easy to operate compared to common remote controls, it should preferably be possible to interact with the remote control entirely through one or more handling actions detectable by the device. The recognizable handling actions are described in a later section.

Geometry of the Remote Control

The remote control preferably comprises a plurality of flat polygonal surfaces such that the geometry of the remote control substantially resembles a polyhedron. Each output surface is preferably associated with a specific piece of digital content (or a collection of digital content), such that a user may select said content by placing the remote control with a specific output surface in a predefined direction. In order to maintain said selection, the geometry of the device should preferably allow the orientation of the remote control to remain stationary once a selection is made. This may be achieved from a variety of different geometries of the remote control. Some geometries allow the remote control to be placed on a flat surface and maintain the orientation by itself; other geometries may need a holder for keeping the orientation of the remote control stationary after the user leaves the remote control. A subset of polyhedra especially suited for this purpose is convex regular polyhedra, also known as platonic solids. Therefore, the remote control may approximately resemble the shape of a platonic solid. The cube is an example of a platonic solid. In one embodiment, the remote control comprises an even number of surfaces and a symmetry such that, when placed on a flat surface with one surface pointing down, an opposing surface is pointing straight up. The remote control may also comprise one or more curves surfaces, as an alternative to the group of polyhedrons. As an example, the remote control may approximately resemble the shape of a cylinder. The circumference of the cylinder may be divided into a plurality of arcs, wherein each arc may constitute an output surface by pointing said surface substantially in a predefined direction such as towards the user.

Setting Up the Remote Control

The setup of the remote control may begin with a selection of digital content from a database repository or an upload of digital content to said database. In either case, the selection and/or upload may be performed using a software application running on a personal electronic device such as a smartphone. The software application may also be provided as a webpage, which allows the user to select digital content from a large variety of categories. The selection process may either be a direct selection of individual files or an indirect selection by answering questions about the habits and preferences of the user such as taste of music, profession and personal interests. In one embodiment, the system comprising the database and the personal electronic device is able to suggest the most relevant digital media based on the answered questions. This may be achieved through the use of a computer-implemented algorithm that employs artificial intelligence (AI).

The aforementioned software application preferably allows the upload of digital content directly from the personal device (e.g. from a smartphone) to a database, preferably a cloud-based database. The upload may be achieved using Wi-Fi or other network protocols. Said digital content may be personal content such as images, videos, recordings or preferred music. As an example, the content may comprise personal photos representing highlights of the person's life, which may be particularly relevant in case the person is diagnosed with dementia. Several people may preferably upload to the same user account, but all data transfer preferably involves access control and end-to-end encryption. As part of the upload and selection process, the digital media may be sorted and assigned to different digital collections by the user. The data will preferably be stored in a secure (encrypted) cloud-based database.

The remote control is preferably configured such that personal content may only be retrieved from the database in case it belongs to the user or owner of the remote control. Accordingly, the database may contain personal content from a large number of persons, however each remote control should only be able to access personal content uploaded by the owner of that specific remote control or people associated with the owner (e.g. relatives or close friends) along with generic digital content that is available to all users, either freely or through a payment. As an example, the remote control may initially not be able to control or retrieve any digital content from the database, since that content belongs to other users. Accordingly, the remote control may be configured to unlock secure content belonging to the user of the remote control.

Reconfiguration of the Remote Control

The remote control may be reconfigured at any time, either by uploading new content to the database paired with the remote control, or by assigning the surfaces of the remote control to other content present in the database. The database may be a remote server, a local server, or a cloud-based database. It is preferred that the database is a cloud-based database. The database may comprise generic digital content that is available to the user e.g. upon payment of an additional fee or through a user subscription. It may also comprise personal content that is only accessible to the owner of said content or the user who uploaded the content to the database. The generic data may comprise nature sounds, images, documentaries, wildlife footage, music, etc. Other types of generic data could also comprise news updates, exercise programs, sport updates, hobbies and special topics of interest to the user. This content may be accessible through licenses. The database may also contain audio files such as calming music or music designed to follow a daily rhythm. The digital content contained in the database may be used as part of the method described in the second aspect of the disclosure.

Associating the Output Surfaces with Digital Content

The output surfaces of the remote control typically need to be associated with the digital content such that each output surface corresponds to a specific piece of digital content (or a collection of digital content). A digital collection may comprise a collection of images, a collection of videos, a collection of audio files, and/or combinations thereof. As an example, one output surface may be associated with a collection of childhood memories, a second output surface associated with a collection of images of the person's family members, a third output surface with a collection of highlights of the person's life, etc. Accordingly, once the remote control is set up, each output surface is paired with a collection of the available and uploaded digital content in the database, such that it can be used to initiate the playback of said digital content on an output device (see FIGS. 6A and 6B). Once the remote control is set up, each output surface of the remote control is preferably associated with a specific piece of digital content (or a collection of digital content), such that each output surface of the remote control constitutes a possible selection.

Representative Information

Figure 1:
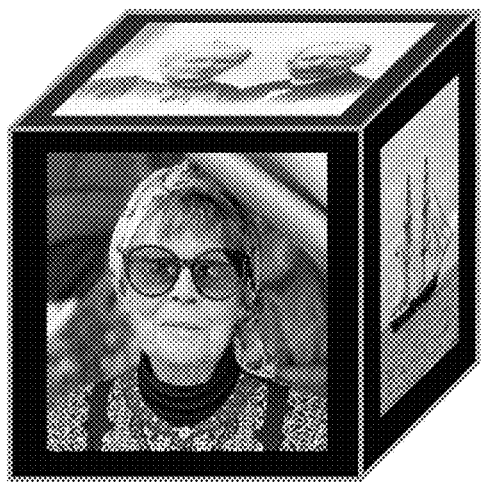
FIG. 1 shows an embodiment of the remote control according to the present disclosure, wherein the remote control resembles a cube. A plurality of the surfaces of the cube are provided with representative images, wherein each image represents a selection of the available digital content such as a collection of images.

The exterior output surfaces of the remote control preferably comprises a piece of information that represents the particular collection associated with that output surface, such that the user is able to distinguish the different choices. The piece of representative information may be selected among the group of: texts, images, symbols, logos, or videos. As an example, each output surface may be provided with an image representing the digital playable content in order for the user to get a preview of the content (see FIG. 1). According to one embodiment of the remote control, each of the output surfaces configured for controlling digital content is provided with static content constituting representative information, e.g. a static image. The static image may comprise any of the following: text(s), photograph(s), symbol(s), logo(s), and/or combinations thereof. The static images may be removably attached to the housing using a number of different techniques, such as by magnets, by a frame for holding the static images, or by use of hook-and-loop fasteners (e.g. Velcro). Alternatively, an electronic screen may be integrated in one or more of the output surfaces for displaying content representing a selection of the available digital content. As an example, each output surface may comprise an E ink screen or similar, which may be used to display an image, or a series of images, wherein the displayed image changes dynamically over time. However, it is preferred to provide the surfaces of the remote control with static images (e.g. printed images either provided on paper or a plate) to increase the battery life of the remote control, since electronic screens (e.g. LED or LCD screens) typically consume too much power (the remote control is intended to be powered by batteries), which would decrease the battery life. The representative information on the output surfaces of the remote control is useful to inform the user of his/her options for choosing the different available collections of the digital content. In one embodiment, the remote control comprises means for inserting a printed image on each output surface of the housing of the remote control. Said means may be holders or slots for holding said printed images. In one embodiment of the remote control, each output surface comprises a frame arranged on the exterior surface of the housing or alternatively the frame constitutes the exterior surface of the housing. The frame is preferably configured for holding a plate and/or a printed image (i.e. a static image), such that the plate and/or the printed image is removably attached to the housing. Preferably, a user may exchange the plate/image by sliding it in or out of the frame provided on the exterior of the housing. Alternatively, the user may exchange the plate/image by a snapping motion, i.e. by pressing the plate/image into the frame. The frame may preferably comprise transparent windows, such that an image placed in the frame is visible from outside the remote control. Such a frame is visible on FIGS. 13-14. The plate is preferably a transparent plate such that light from a light source embedded in the housing may be transmitted, wholly or partly, through the plate. The static image(s) may be provided directly on the plate (e.g. printed on the plate) or the plate may be used in combination with a printed image (e.g. printed on paper).

Mode of Operation

Preferably, the user may select and initiate the playback of digital content solely by orienting the remote control in a specific direction, i.e. without interacting with any buttons.

In general, the number of available choices for making a selection of the digital content corresponds to the number of output surfaces on the housing of the remote control. One of the surfaces may be configured for stopping and/or pausing the playing of the digital content. In one embodiment, the remote control comprises six surfaces, wherein four of the surfaces are configured as output surfaces, one of the surfaces is configured for pausing the playback/presentation, and the last surface is configured for terminating the presentation, shutting the system off, or setting the system in a standby mode. The remote control comprises at least one sensor for registering the orientation and/or the rotation of the remote control. This enables the remote control to know at all times the direction of each output surface and/or which output surface points in a predefined direction, e.g. upwards. Once the user has oriented one of the output surfaces in a predefined direction, the remote control preferably immediately initiates the playback of the digital content associated with that particular output surface on a nearby output device, e.g. a monitor or television.

Confirmation of Choice

Preferably, the output device and/or the remote control issues a confirmation to the user relating to the choices or actions performed by the user. The confirmation can be light, sounds, vibrations, displayed images or messages on the output device or on the remote control. This confirmation facilitates usage of the device and enhances discoverability of the interface, which is particularly important for mentally impaired persons such as people diagnosed with dementia. In one embodiment, where a particular digital collection is selected for presentation (e.g. by turning a corresponding output surface upward), the action is confirmed by illumination of the chosen surface (e.g. by pulsing or flashing internal light sources, such as LED's, embedded in the remote control), by vibration of the controller, and emission of a selection sound. A sound or voice command may also be emitted from any of the output device, the remote control, and/or the electronic device, and a corresponding image of the remote control with the chosen collection image may be presented on the output device.

Other actions such as turning the remote control to pause a presentation, pressing a button, turning a volume knob etc. may also be confirmed by images on the output device to show what particular action caused the system change (e.g. changing audio volume, pausing presentation, or turning the system off).

Digital Collections

The digital collections will typically be contained in the aforementioned database, e.g. a database separate from the remote control. The collections may comprise different types of digital media, and the system and/or the user may generate presentations comprising content from the collections. Preferably, the system can automatically generate a presentation based on content from a digital collection selected by a user. The presentations may be played along with other digital content available in the database (e.g. ambient sounds, ambient lighting, scents, etc.). As an example, once a user requests a collection, the system may create and play a presentation of images in combination with various music or sounds. Another example is a video being played while the lights are dimmed; both may be initiated from a single surface of the remote control, or by turning said surface in a specific direction. Accordingly, there might be numerous ways of combining the available digital content or digital collections. A digital collection may be created manually by a user, e.g. using a separate electronic device such as a smartphone, or it may be automatically created or suggested by the system, e.g. the electronic device linked to the database. The automatic creation may be based on different forms of input (e.g. answers to questions) from the user. Each collection may contain pictures, sounds, music, videos, and/or combinations thereof. As an example, a collection may contain pictures from the person's life, said pictures displaying key events, work celebrations, friends, places the person has lived, etc. Another collection may contain pictures and videos of the person's family members, e.g. wife, children, grandchildren, siblings, etc. Yet another collection may contain digital content representing the travels and journeys that the person has experienced during his/her life. Yet another collection may contain pictures, sounds, and/or videos from the person's favourite nature habitats and animals, e.g. forests, beaches, mountains, lakes, etc. The collections serve multiple purposes. One purpose is to share the presentation of personal content between family members, friends, and relatives, and the person owning the remote control. Another purpose is to enhance the well-being of people with dementia, since the collections enable them to relive their memories and to help them retain and remember their identity. The playback of a presentation comprising content from the digital collections may be initiated using the remote control.

The digital collections may be manually named e.g. by relatives to the user. This may be done using a separate device e.g. via an application running on a smartphone linked to the system. Alternatively, the application may be pre-configured with suggested names for the digital collections. The user or relatives to the user may add content to the digital collections at a later point in time. The time at which the content is added and information about the origin of the content, e.g. the time and place of creation are preferably also stored in the database. This information may be used to improve presentations and/or improve previews of the material, e.g. by generating and/or displaying presentations comprising recently added content. Similarly, the names and topics of the collections may be changed e.g. using an app. The application may be used to upload and/or capture images from the rooms of previous residences (e.g. to recreate colour matched surroundings). Other examples of digital content that may be uploaded include sounds from the previous residence of the person, images/videos of views from the windows, as well as recordings and videos of family life and music the person used to prefer. Preferably, it will also be possible to do time-lapse recordings of sounds and views from favourite windows and other places of interest that can be recreated in the person's environment. The uploaded digital content should preferably be stored in the database described previously.

Recognizable Actions

The remote control is preferably configured for detecting one or more actions performed by a user. Such actions may include rotating the device around different axes (clockwise or counter clockwise), moving the device along an axis, pushing the device, tapping a surface of the device, shaking the device, flipping the device, holding the device, covering one or more surfaces of the device with a hand, and/or combinations thereof. This may be achieved by integrating a sensor system in the remote control, said sensor system comprising at least one sensor for detecting one or more of said actions. The sensor system may comprise any of the following: tilt sensors, accelerometers, gyroscopes, magnetometers, light sensors, temperature sensors, microphones, cameras or combinations thereof, such as an accelerometer and a gyroscope, or an accelerometer and a tilt sensor, or an accelerometer and a magnetometer, or the combination of an accelerometer, a gyroscope, and a light sensor. The actions should be associated with one or more commands or instructions.

Additionally, the remote control may be able to detect the duration of a tap or the number of taps, such that these actions may be associated with different commands. A command may also constitute several actions performed in succession and combinations of actions. As an example, the remote control may be rotated 90° or 180° such that a new output surface points upwards, and the digital collection associated with that output surface automatically starts playing on an output device such as a tablet or a TV. Rotating the remote control such that another output surface points upwards may initiate the playing of another digital collection. Rotating the remote control yet again such that it is returned to the original position may replay the previous digital collection or alternatively generate a new and possibly longer digital media file, which is automatically generated and played immediately. Rotating the remote control clockwise with the same output surface upwards may be used to increase the sound level, and a counter-clockwise rotation may lower the sound level. Covering the currently active surface (e.g. the output surface pointing upward) with a hand, may interrupt or pause an ongoing presentation. Alternatively, another surface may be used to pause the presentation.

Figure 12:
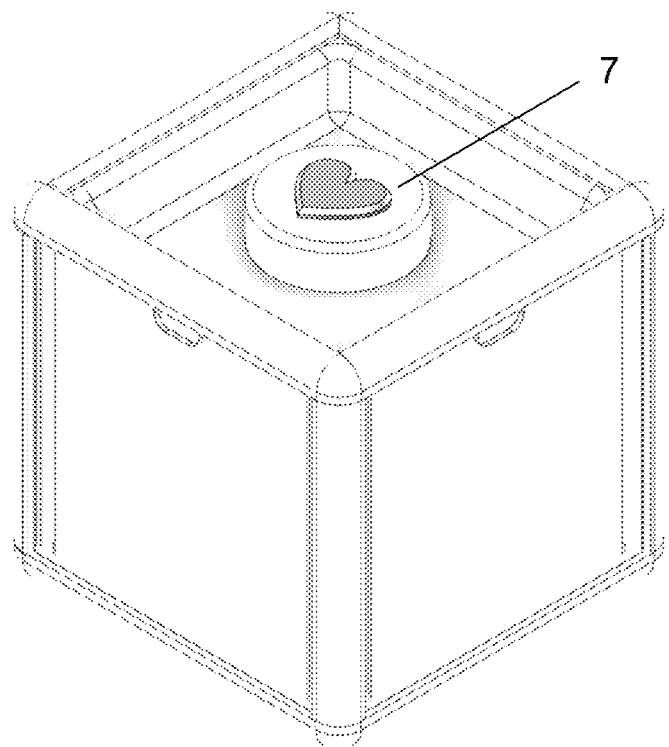
FIG. 12 shows an embodiment of the remote control, wherein the housing comprises six surfaces, wherein one of said surfaces is recessed in the housing. A button 7 is integrated in the recessed surface, said button being configured to grade the digital content, e.g. label the content with a 'like', upon being activated by a user. The button may comprise a push-button and/or a knob.

In one embodiment, one of the surfaces is recessed in the housing, wherein a button may be placed in the recessed surface. The presentation of the digital content may be paused by orienting the recessed surface in a predefined direction such as upwards. Accordingly, the remote control may comprise a button on one of the surfaces; preferably, the button is placed in a recessed surface in the housing. In case a button is placed in a recessed surface of the housing, said surface is preferably configured such that the remote control may be placed with recessed surface facing downwards e.g. against a table, however without the button contacting the table. The button may comprise a knob and/or a push-button. In one embodiment, the button is a combination of a knob and a push-button, such that the button may be turned, e.g. to increase the volume, and the button may be pushed, e.g. in order for a user to grade the digital content by pressing the button. The turning of the button may additionally/alternatively be configured to allow the user to scroll through a series of images/videos in order to select a particular image/video. The output device preferably provides feedback indicating the transmitted command, e.g. it may indicate that the volume is increased, if a user turns the button on the remote control, or it may show an intended selection in e.g. the bottom of the screen. The push-button may resemble a heart as depicted in FIG. 12, wherein the button is configured to indicate a 'like' of a certain image or video forming part of a digital collection being presented. The grading of the digital content (i.e. whether a person likes the content or not) may be stored in an electronic device, a remote server, a mobile phone, or similar, said device(s) forming part of the system. The push-button may be configured to identify a double press and/or a long press, or combinations thereof. Preferably, the output device (e.g. a monitor, tablet, television, or similar) immediately shows the transmitted command on a screen of the output device. As an example, the output device may display a range of different icons, each icon associated with a particular command, e.g. a pause icon, when an ongoing presentation is paused. The output device may further display a plurality of smaller pictures resembling the image(s) preceding/succeeding the currently displayed image. The aforementioned button may be used to select an image among the plurality of smaller pictures. In case the remote control is provided with only a single button (e.g. provided in the recessed surface), the button may be configured such that it has different functionality depending on which surface of the remote control is oriented in the predefined direction (e.g. upwards). As an example, if an output surface is oriented upwards and a presentation of digital content is running, the button may be used to change the volume of the presentation. If the surface comprising the button is oriented upwards, the same button may be used in this case to change among the images in the (now paused) presentation.

Additional action/gestures may be implemented and controlled e.g. in a settings menu accessed by caregivers or relatives when they set up the system or adjust the system to the preferences of the user. Such a settings menu may be part of an application running on an external remote device such as a smartphone, wherein said device may communicate with the system comprising the database, the remote control, and the electronic processing device and/or the output devices. The remote control may provide feedback to the user in order to confirm that a given action has been registered by the device. The feedback may comprise vibration of the remote control, flashing lights, illumination of one or more surfaces of the remote control, change of colours, sounds, etc. The remote control may comprise electronic displays that may change brightness level, emitted colour, or similar, in response to a given action or handling of the device. It may also comprise light sources that similar to the electronic displays may change in brightness or colour. The system may employ different feedback (e.g. illumination or emitted sound) to indicate initiated action or completed action, as well as the success or failure of the completed action. As an example, the remote control may display a dim steady light when the controller is handled by a user followed by a stronger pulsed light once a selection of a particular collection is registered. It may also play a sound to indicate a successful selection of a collection, and a different sound to indicate an unresolved selection where the user input was ambiguous, e.g. in case the remote control is oriented such that it is unclear, which output surface is intended for selection by the user.

Communication Unit

The remote control preferably further comprises a communication unit for wirelessly communicating with one or more output devices either directly or via an electronic device (described below). The communication unit may communicate using any suitable existing information technology, e.g. infrared transmission, Bluetooth, Bluetooth Low Energy (BLE), Ultra Wideband (UWB), Wi-Fi, IEEE 802.11ah (Wi-Fi HaLow), GSM, 4G, 5G, or other similar technologies. In one embodiment, the remote control is configured for BLE communication with the electronic device.

Electronic Device

The system may further comprise an electronic device, which preferably constitutes both a processing unit and a communication link between the remote control, a database containing stored digital content, and the one or more output devices (see FIG. 6B). A single electronic device may be configured to receive input from more than one remote control. As an example, a user may have one remote control setup to select digital content comprising family photos and another remote control setup to select digital content relating to various favourite music of the user. The last action and the identity of the controller where the action was performed determine the outcome, e.g. which presentation is being played. The electronic device may be integrated in said one or more output devices, or it may be a separate computing device such as a tablet, a smartphone, a computer, similar computing devices. It may also be integrated in the remote control itself. An example of a suitable electronic device is a computing device, which is configured to access curated and encrypted digital media files belonging to a particular user from a cloud-based database. Accordingly, the electronic device may be configured for decrypting data received from a database, said database storing the digital content (such as images) in encrypted form. Preferably, the electronic device should be further configured for displaying the digital media on a connected monitor and/or playing associated sounds e.g. using built-in speakers, when receiving appropriate input from the remote control. The electronic device may further be configured for rendering visual images and/or movies on a connected monitor using e.g. Chromecast or Apple TV, or a wired connection. The electronic device may also comprise an interface for connecting to said monitor, e.g. via HDMI. It may play sound on associated Bluetooth speakers, adjust room lighting (Philips Hue), turn on a fragrance system, or combinations thereof. In a preferred embodiment of the presently disclosed system for controlling digital content on an output device, the electronic device is configured for wireless communication with the remote control, e.g. via Bluetooth or Bluetooth low energy (BLE). In this embodiment, the electronic device is further configured for wireless communication with a cloud-based database, e.g. via a cellular network such as 4G. This enables the electronic device to retrieve digital content from the database. Preferably, the electronic device is configured for creating a presentation comprising one or more images based on the digital content. An example of an electronic device configured for this purpose is a computing device comprising an integrated BLE module and an interface configured to connect a 4G USB-modem. Preferably, the electronic device further comprises an interface for connecting an electronic display/monitor, e.g. a High-Definition Multimedia Interface (HDMI), DisplayPort (DP), Digital Visual Interface (DVI), or other types of digital display interfaces. Hence, the electronic device may be configured to connect to a monitor, a TV or similar, and it may be configured to render images and/or video to be presented on said monitor and/or TV. An example of such a system as described above is shown in FIG. 6B. Preferably, the electronic device is configured such that any received command from the remote control will initiate the associated action on the output device, even in the event that the output device was used for something else, when the command was issued. As an example, if the output device is a television, the television may already be displaying a TV channel, when a user decides to operate the configurable remote control as disclosed herein. In that case, the command from the presently disclosed remote control should preferably overrule any content currently being displayed on the output device. This functionality may be realised by a protocol such as the consumer electronics control (CEC) protocol that ensures that HDMI units will be prioritized/take over the transmission.

The electronic device may be embedded in a housing. The electronic device including the surrounding housing may be configured to snap on to a monitor to provide a user-friendly set-up or it may be provided as a separate unit. The electronic device preferably comprises a memory device, or it comprises an interface for connecting a memory device. The memory device is preferably a non-volatile memory. Preferably, the electronic device is configured to retrieve digital content from the cloud-based database upon instructions from the remote control. The electronic device may comprise a modem for connecting to a cellular network such as 4G. Hence, the electronic device may be configured to download digital content from the database and store it locally on a storage medium connected to the electronic device. This is useful in case of no internet connection, since the user of the remote control will still be able to display the content on a connected monitor. The electronic device may be connected to a camera, such as a webcam, said camera preferably being embedded in the housing of the electronic device. In that case, the housing preferably comprises an opening such that the lens of the camera is visible from the outside of the housing. The housing of the electronic device may further comprise a button connected to the electronic device, said button being accessible from the outside of the housing. The button may be configured for a variety of purposes. As an example, a user may record and/or send a message by pressing the button. The message should preferably be received by relatives of the user, said relatives using the software application associated with the remote control as explained in more detail elsewhere in the application. Relatives may also use the software application to record or type message(s) and send the message(s) from the mobile device running the software application to the electronic device connected to the remote control. The button may also be configured such that a user can select a recipient of the message by holding the button (e.g. for a few seconds) and subsequently turning the button to select the recipient.

Analysis of Usage

The processing unit will typically monitor and receive command(s) transmitted by the remote control, e.g. a command denoting a change in orientation. Based on the command, the processing unit may then retrieve the relevant digital content (e.g. images, sounds and/or other effects) from the database repository, such that the data is stored locally on the processing unit. Subsequently, and preferably immediately, it will display the requested digital content on a display or send instructions to separate display unit(s). The display may be an integral part of the electronic device (e.g. as is the case of a tablet, cf. FIG. 6A), or it may be a separate display such as a TV screen, a monitor, or similar (cf. FIG. 6B). The displayed content will preferably be a presentation comprising a selection of digital content from the chosen digital collection. The presentation may comprise a variety of content (e.g. images, sounds, music, video) and effects (e.g. transitions, animations, panning, zooming), and combine different content with different effects. The duration and composition of the presentation including the length of the different segments, transitions and complexity may be controlled and adapted by the processing units based on the habits and interaction of the user with the controller. The electronic device may be configured to execute a computer-implemented algorithm based on artificial intelligence. The computer program may be stored locally on the electronic device or on a remote server such as the database, e.g. a cloud-based database. The handling and/or usage of the remote control may be analysed using pattern recognition and/or artificial intelligence. The cloud-based database may further store usage of the remote control from many users, e.g. the times and duration that each remote control was used, in order to collect statistics relating to usage.

The AI algorithm may select digital media from the database in order to compose a combined digital collection or presentation comprising images, animated images, video clips, appropriate transitions and backgrounds, and/or music/sounds. The duration of the presentation may initially be short (e.g. 2 to 3 minutes) and it may only comprise a subset of the digital data in the collection. When the presentation has finished, it will preferably stop and nothing is displayed until a new collection is chosen (or the same collection chosen again). In the default mode the material comprising the presentation may change every time a particular collection is chosen by the remote control.

Creating a good presentation from a collection of digital content requires some level of understanding the individual elements e.g. in the image(s). As an example, it is preferable that a family picture is shown for a longer time than a picture of a generic object such as a flag. Therefore, the electronic device is preferably configured for adjusting the transition frequency depending on the complexity of the individual elements in the image(s). This may be achieved using machine learning that is able to characterize the images based on the specific elements in the images, e.g. based on the presence of human beings in the images. Similarly, it is desirable to identify the number and position of faces in the image, so that particular animation effects can be selected in order to focus on the people in the image. Finally, it is important to understand the elements/content of the image(s) to provide appropriate ambient sound to enhance the experience (e.g. bird song to images with trees from a forest, sounds of waves and seagulls to sailing images etc.)

The duration and pacing (e.g. the duration of individual scenes and frequency of changes) may also be adapted to the mental condition of the user, the progression of the illness, as well as individual preferences and habits. These parameters may change over time as the disease progress. In case the same collection is chosen repeatedly/frequently, the duration of subsequent presentations in this category will preferably be extended.

The system will preferably keep track of which collections are being watched, when, and for how long. This may be achieved by the electronic device that received the commands from the remote control.

Rating the Digital Collections

The digital collections may be rated according to user preferences. The ratings may be conducted by an AI algorithm that connects specific patterns of usage with user preference. As an example, digital collections that are chosen more frequently may be interpreted as "preferred" and thus receive a higher rating. Presentations that are being watched to the end might similarly receive a higher rating, as might all the individual components of the presentation (images, sounds, videos, which were shown as part of the presentation). Conversely, abandoning or exiting presentations may result in a lower rating of the interrupted presentation and/or material. The digital content that was shown at the exact moment of interruption may be given the lowest rating compared to other digital content in the same presentation. In case the user pauses and subsequently resumes the presentation of a digital collection, the specific content (e.g. image or video) that is being paused may receive a higher rating under the presumption that the digital content is being studied further by the user or talked about by the user and relatives/caretakers of the user. The remote control may also comprise a button configured to directly rate the digital content forming part of a digital collection. In one embodiment, the remote control comprises a button positioned in a recessed surface. When a user presses the button, the currently presented content (e.g. image or video) is being labelled with a 'like'. The label may be transmitted from the remote control to the electronic device, and further to the database, where it may be stored. Furthermore, the 'like' may appear as a notification in the software application running on a mobile device belonging to the person who uploaded the digital content, i.e. the label may be transmitted from the remote control to the mobile device via the electronic device and the database.

The ratings of the presentations may be used to curate the digital collection, i.e. sort the digital content in said collection according to apparent user preference. The AI system may use the ratings to display digital content of higher ratings. The playback of the digital content may be initiated autonomously by the electronic device. This might be the case, when the system is used to enhance the well-being of e.g. an elderly person or a person with dementia. As an example, the system may initiate the playback of a presentation after a long period of inactivity during the daytime. It may also be used to calm a user that appear agitated. The level of activity may be monitored by a sensing system comprising at least one sensor in the room (e.g. a motion detector, or a sound sensor) and/or at least one wearable sensor worn by the person situated in the room. Alternatively, the level of activity may be correlated with the number of commands received by the electronic device. The ratings may be used together with general settings and preferences, activity pattern, habits, time of day etc., to select material with the highest possible chance of having the desired effect, e.g. to increase the well-being of a user with dementia.

The general usage patterns may be used diagnostically to provide information about disease progression and/or current personal status. The usage pattern may be obtained by monitoring and analysing the user's interaction with the remote control. Said analysis may provide valuable information such as the current condition of the user, the diagnosis and disease progression, and/or the immediate interest in the presentations being displayed. The information may be combined with information obtained by other means e.g. through sensors placed in the room of the user or sensors worn by the user. The sensors may include sensors for sensing/registering movement, position, sound, light, heart rate, respiratory rate, etc. The additional information may further contribute to establish an insight into the user's well-being or the user's state of mind. Metrics on the usage of the system may be stored in a database and/or presented visually on e.g. an application linked to the system. This will provide friends and relatives to the user with statistics on the highest rated content etc., which may further motivate them to repeatedly upload new material to the database.

Size of the Remote Control

The remote control may come in various shapes and sizes to accommodate the needs of different users. As an example, elderly people that are mentally well might want a remote control with more than six surfaces (e.g. a dodecahedron), in order to have immediate access to and control with more digital collections. The remote control might also be set up to recognise many actions or more advanced user input. They may also want settings that prioritize new material, special categories for particular topics, and/or longer presentations with a faster pace. On the other hand, people with dementia may want a simpler system and interface, but still with autonomy that allow them to select when and which presentation they want to display. They may also want to share these presentations with visiting relatives and possibly neighbours and nursing staff at the nursing home. People with more advanced dementia may not be able to interact with the controller, but may benefit from occasional autonomous stimulation. In this case, it might be an advantage to have external sensors to help determine when/if a stimulation is desired and what type of stimuli should be used.

Nonetheless, the remote control is still useful as a means for switching off the system, e.g. by nursing staff.

The remote control preferably has a size such that it is easily operated using only a single hand. It should be large enough that the information on each surface (e.g. an image) is clearly readable and distinguishable from the information on the other surfaces. The size of the remote control should also not be so small that it easily becomes missing, e.g. in the pockets of the owner. The length of each edge of the remote control may preferably be approximately between 5 cm to 12 cm, or 6 cm to 10 cm, or 7 cm to 9 cm. Other embodiments of the remote control may have different dimensions depending on the intended usage. As an example, the remote control may be smaller in case it needs to be carried to other places such as when visiting relatives, or it may be larger e.g. for sharing an experience with many participants.

Additional Features of the Remote Control

The remote control may comprise additional features to further enhance the user experience. As previously mentioned, it may comprise electronic screens to display either static or dynamic images, or even videos such as previews. Since electronic screens generally use a significant amount of power compared to the power typically available from batteries that are able to fit inside the remote control, the remote control may comprise means for wireless charging, e.g. inductive charging. An example of a system capable of wireless charging is the Qi wireless charging pad. Alternatively, the remote control may comprise E Ink ("electronic ink") displays, since they generally consume less power than traditional displays. The E Ink displays would be suitable to display static images that might change occasionally.

The remote control may also comprise a receiver for identifying nearby broadcasting device(s) and/or personal tag(s) (e.g. transmitters such as beacons) carried by other users. Said broadcasting may be based on Bluetooth, Bluetooth Low Energy (BLE), Wi-Fi, or similar. This allows the remote control to be exchanged between multiple users, wherein the remote control preferably changes the images and/or previews on electronic screens on the output surfaces of the device, such that the images correspond to the user currently holding the remote control, or in close proximity to the remote control. Accordingly, the digital content associated with the output surfaces of the remote control may comprise personal content uniquely paired between the remote control and a personal tag such as an iBeacon or similar. According to an embodiment of the present disclosure, the remote control comprises at least one electronic display integrated in at least one of the surfaces of the remote control, wherein said display is configured for displaying one or more images representing a selection of digital content or a piece of digital content. The images displayed on the display is preferably associated with a personal electronic tag, wherein the images automatically change in response to identifying a new nearby tag. A personal tag may also be used to unlock a particular digital collection to ensure that content from this collection is only shown when the user is near the remote control. Absence of the tag will prevent other persons from displaying digital content belonging to the locked collections.

The remote control may comprise one or more features that protects the controller. As an example, the edges of the remote control may be covered with a rim configured as a shock absorber. This is advantageous in case the remote control is dropped. The rim may be detachable and may constitute a single piece. The rim is preferably made from a flexible material. The rim may in some embodiments be configured such that it can be mounted on the remote control without the use of tools. The rim may comprise an elastic material such as an elastomer (e.g. natural rubber, synthetic rubber, nitrile rubber, silicone rubber, urethane rubber, chloroprene rubber, Ethylene Vinyl Acetate (EVA rubber), etc.). The remote control may also feature an additional housing for waterproofing the device. Alternatively, the housing of the remote control may be waterproof in itself. The housing may also feature means (e.g. a cover plate) for covering and/or accessing batteries in the remote control.

Figure 16:
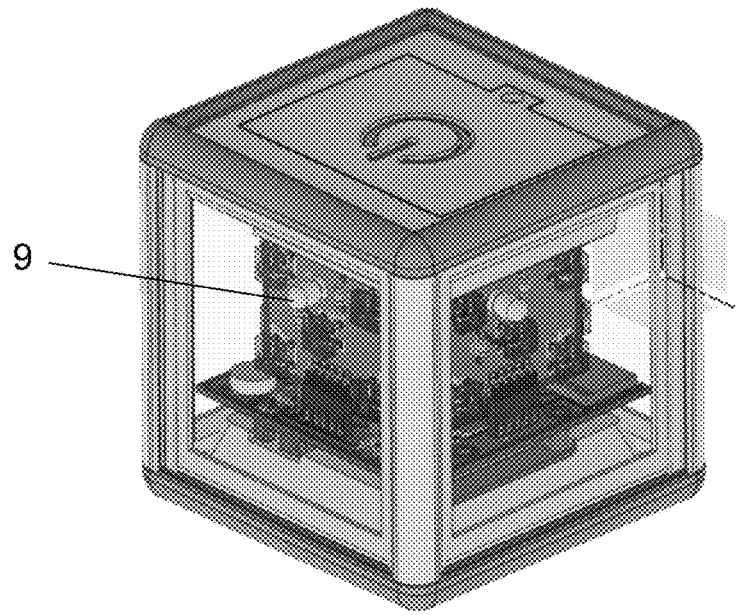
FIG. 16 shows a bottom view of the remote control shown in FIG. 15 without the plates inserted. The bottom surface is provided with a cover for accessing batteries of the remote control, and the remote control is configured to set the output device in a standby mode if this surface is oriented in a predefined direction such as upwards. This embodiment further comprises one or more light sources 9 embedded in the housing.

The remote control may employ elements of nudging to lightly encourage the user to use the remote control. Said elements may comprise flashing or pulsing lights, sounds, spoken messages, vibrations, or other effects. To achieve this purpose, the remote control may comprise light sources e.g. light-emitting diodes (LEDs), speakers, a buzzer or haptic devices. In one embodiment, the remote control comprises at least one light source for each output surface, such that each output surface may be illuminated individually. Such an embodiment is shown in FIG. 16. As an example, an output surface may illuminate or flash in case a user has uploaded new content to a digital collection associated with said output surface. The upload of new content is preferably performed using the software application on a mobile device, wherein said software application is configured for wireless communication with the cloud-based database as previously described (cf. FIG. 6B). The light sources may be placed in the interior of the remote control, on the outside surfaces of the remote control, along the edges of the remote control, and/or combinations thereof. In case the remote control comprises one or more electronic screens on the surfaces, said screens may be used to display previews or trailers for available presentations in the system. The system may autonomously initiate the playback of such previews after a certain period of time or a certain period of inactivity from the user. The system may store an action in order to improve the automated behaviour (nudging) using e.g. machine learning. The electronic device may transmit instructions to the remote control, such as instructions for illuminating different output surfaces using one or more internal light sources, instructions for the remote control to vibrate, and/or instructions for the remote control to play a sound (see FIG. 4). These instructions should preferably be executed immediately by the remote control in order to encourage the user to pick up and/or handle the remote control (i.e. nudging). The controller may suggest interaction after long periods of inactivity (in cases where stimulation is considered beneficial) e.g. by emitting a pulsed light from the controller or by playing sounds or music. The system may provide the user with one or more signals to indicate availability of new material belonging to a corresponding collection. Said signals may comprise illumination of a particular surface or the playback of a sound (e.g. a recorded message).

Accordingly, the present disclosure relates to a remote control comprising a housing comprising a plurality of surfaces, at least one sensor for detecting the orientation of the housing, movements of the housing, and/or combinations thereof, at least one communication unit for wirelessly communicating with an electronic device and/or one or more output devices, wherein the remote control is configured such that a predefined movement and/or orientation of the remote control is associated with a predefined command transmitted via the communication unit, and wherein a plurality of the surfaces are configured for controlling digital content on said one or more output devices, such that each of said surfaces is associated with a predefined selection of digital content on said output device(s).

In another embodiment, the remote control comprises a housing comprising a plurality of surfaces, wherein a subset of said surfaces are configured as output surfaces for controlling digital content on one or more output devices, each of said output surfaces being associated with a predefined selection of digital content on said one or more output devices; at least one sensor for detecting the orientation of the remote control, movements of the remote control, and/or combinations thereof; at least one processing unit embedded in the housing, said processing unit configured for processing data from the sensor; at least one communication unit embedded in the housing, said communication unit configured for wirelessly communicating with an electronic device and/or one or more output devices, wherein the remote control is configured such that a predefined movement and/or orientation of the remote control is associated with a predefined command transmitted via the communication unit.

The present disclosure further relates to a system configured for controlling digital content on an output device, said system comprising: the remote control as described herein, an electronic device comprising a communication module configured for wireless communication with the remote control via the communication unit of the remote control; a first interface configured to connect the output device to the electronic device; and an output device for displaying the digital content, wherein said output device is connected to the electronic device via the first interface. The system may further comprise a software application executable on a remote device such as a mobile phone, the software application configured for executing the steps of: uploading by a user digital content to a remote server such as a cloud-based database; and/or selecting by a user digital content available on said remote server; creating by a user a collection of digital content comprising the uploaded content and/or the selected content.

All of the embodiments of the remote control disclosed herein can be employed in the above disclosed system for controlling digital content on an output device.

The present disclosure further relates to a remote device, such as a tablet, laptop, computer, or smartphone, said remote device comprising a processor and a memory and being configured to run a software application for providing user upload of digital content to a cloud-based database, wherein said content may be retrieved and stored by an electronic device connected to a monitor in order to display the digital content. The user upload of content may also be achieved using a web-application.

The present disclosure further relates to a method of displaying digital content on one or more output devices, said method comprising the steps of: selecting by a user the digital content by orienting one of the output surfaces of the remote control according to the present disclosure in a predefined direction such as upwards; identifying by the remote control the selected output surface and the digital content associated with said output surface; transmitting via the remote control, instructions for initiating the selected digital content on one or more output devices, said instructions being transmitted to an electronic device; receiving and interpreting said instructions by the electronic device; and displaying the digital content on the one or more output devices.

Embodiment of the Remote Control

Figure 2:
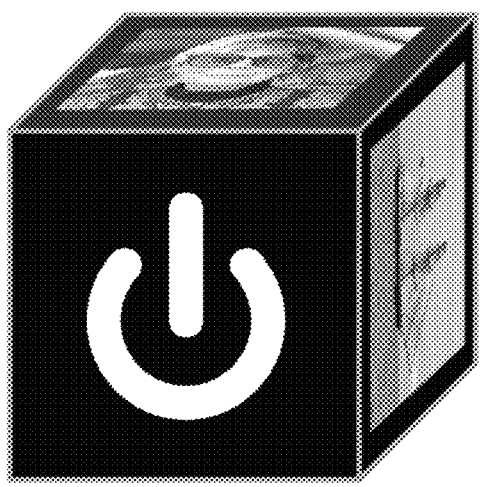
FIG. 2 shows an embodiment of the remote control according to the present disclosure, wherein the remote control comprises a surface configured for discontinuing the playback of the digital content. Said surface is provided with a standby symbol. This surface is not associated with any collection and is thus not considered an output surface, but a control surface configured to stop an ongoing presentation and/or set the system in a standby mode.
Figure 3:
FIG. 3 shows a different view of the embodiment of FIG. 2, wherein the output surfaces of the cube have been unfolded for illustrative purposes in order to display the various images, each image representing a specific collection of digital content. The sixth surface, which is a control surface is not explicitly shown in this figure.
Figure 13:
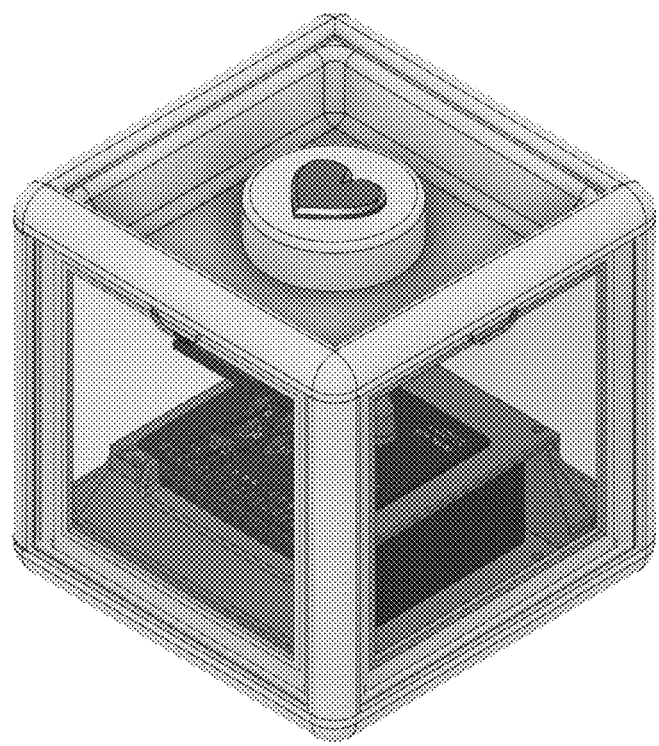
FIG. 13 shows the embodiment of the remote control shown in FIG. 12, wherein the output surfaces comprise transparent windows and a frame for holding a plate and/or a printed image, which may be slid into the frame from above. A processing unit is embedded in the housing (here visible through the transparent windows)
Figure 14:
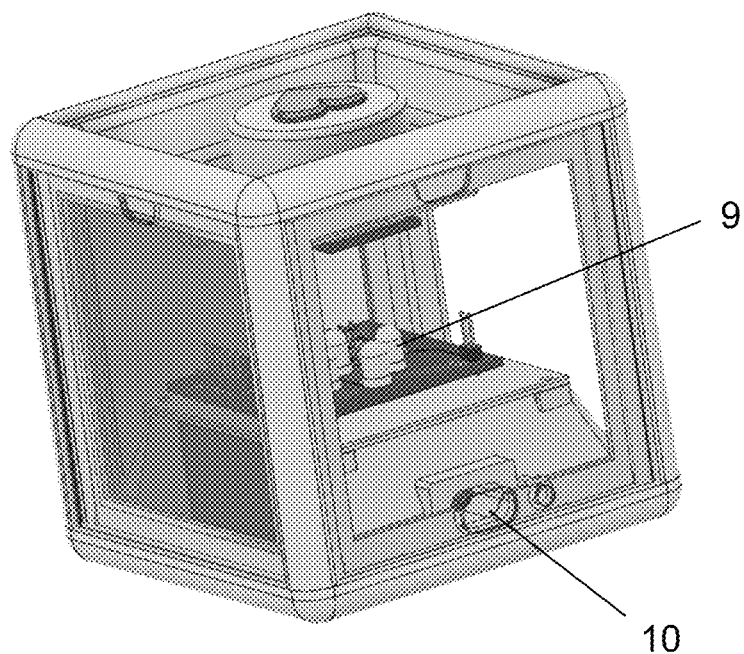
FIG. 14 shows another view of the embodiment shown in FIG. 13. In this embodiment, the housing comprises an opening 10 for inserting a charging cable for charging the remote control. The housing may alternatively or additionally comprise a battery cover for accessing batteries inside the remote control. This embodiment further comprises one or more light sources 9 embedded in the housing.
Figure 15:
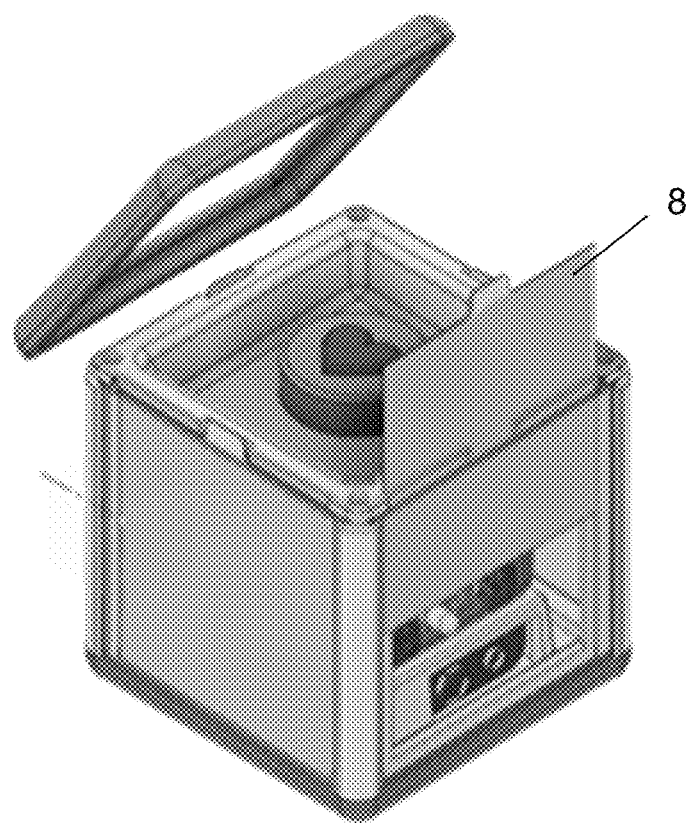
FIG. 15 shows an embodiment of the remote control, wherein the remote control comprises a frame for holding a plate and/or a printed image. In this view, the top rim of the housing has been removed and one plate is half inserted into the frame for illustrative purposes.

In a preferred embodiment of the remote control, the remote control resembles approximately the shape of a cube (see FIGS. 12-14). The cube comprises six rectangular surfaces, wherein four surfaces are configured as output surfaces, each output surface being associated with a digital collection comprising a variety of digital content stored in a database or in a memory device (preferably a non-volatile memory) in the electronic device described herein. The digital collection may be selected by placing the remote control such that the output surface associated with said collection points in a predefined direction, preferably upwards. The length of each edge of the cube may preferably be approximately between 5 cm to 12 cm, or 6 cm to 10 cm, or 7 cm to 9 cm. In the preferred embodiment, the edges of the cube are approximately 9 cm such that the dimension of the cube is approximately 9 cm×9 cm×9 cm. In the preferred embodiment, one of the surfaces is configured as a "standby surface", which stops any currently running digital content and sets the system in a standby mode. This particular surface may comprise a standby symbol (IEC 60417-5009) as seen in FIG. 2, or it may simply comprise a battery cover for accessing batteries in the remote control. Accordingly, the digital content can be discontinued by orienting said standby surface in a predefined direction, preferably upwards. In this embodiment, the digital content comprises personal content (such as personal photos, videos, or music), which may be uploaded by a user to the database and later accessed upon request.

Method for Adapting the Environment

In a second aspect, the present disclosure relates to a method for adapting the environment of an individual, in particular relating to a person diagnosed with dementia. Typically, the presently disclosed method for adapting the environment of a person begins by obtaining data relating to the person situated in the environment. The data will typically be personal data and may comprise health-related data, biosignals from the person, data related to the behaviour of the person, or combinations thereof. Accordingly, the data of the person may comprise information relating to: heart rate, respiratory rate, movements, galvanic skin response, electrical function of the heart (e.g. via electrocardiography, ECG), electrical activity produced by skeletal muscles (via electromyography, EMG), facial expression, eye tracking, housing posture, position, sounds of the person, or combinations thereof.

Sensor System

The method may employ a number of sensors suitable for obtaining and/or tracking the above-mentioned data. The data may be obtained in real-time using a sensor system comprising at least one wearable sensor and/or at least one room sensor. Examples of wearable sensors include commercially available fitness trackers, health tags, smart watches, skin-mounted patches, bracelets, or combinations thereof. Examples of room sensors include motion detectors, optical sensors, ultrasonic sensors, photodetectors, light sensors, infrared sensors, cameras, microphones, sound sensors, or combinations thereof. The sensor system may comprise any combination of the aforementioned examples of sensors. In one embodiment of the presently disclosed method, the sensor system is a non-intrusive sensor-system comprising a wearable sensor worn by the person (e.g. a health tag) and at least one room sensor located in the environment of the person (e.g. a passive infrared (PIR) sensor). The wearable sensor may comprise an accelerometer, a gyroscope, a magnetometer, a heart rate monitor, a respiratory rate sensor, an optical sensor, a sweat sensor, and/or combinations thereof. The wearable sensor is preferably capable of transmitting data in real-time. Said transmission may be achieved using e.g. Bluetooth, Bluetooth Low Energy (BLE), Wi-Fi, 4G, 5G, or GSM. In one embodiment of the method, the wearable sensor is a health tag (e.g. the Spire Health Tag) comprising a battery, a 3-axis accelerometer, an optical PPG (photoplethysmogram) sensor, a respiratory force sensor, a BLE transmission unit, and a feedback mechanism. In this embodiment, the wearable sensor is configured for transmitting data in real-time via Bluetooth.

Data Analysis

Typically, the next step of the method is data analysis. The data analysis is preferably performed by a computer-implemented algorithm utilizing machine learning or other artificial intelligence (AI) approaches. One purpose of the machine learning is to establish a measure of the person's well-being based on the obtained data. This may be done by correlating information from a plurality of sensors. By comparing e.g. the temporal changes in parameters such as heart rate to motion sensor signals, it will be possible to determine whether changes in the former is caused by the latter. Normal movement will typically increase the heart rate and the skin conductivity. However, in case of anxiety and/or aggression of the person, the heart rate and skin conductivity may increase prior to any increase in movement. The sensor system described above provides input to a machine learning algorithm, e.g. a neural network, which analyses the data and calculates one or more parameters describing the well-being of the person. Accordingly, a lot of information contained in the real-time data is condensed into a few quantifiable measures relating to the person's well-being. The measures may comprise estimates of satisfaction/content, activity level, agitation level, and whether the person is preoccupied with other activities or interacting with other persons (e.g. visitors, friends or a caregiver).

Changes of the Environment

Typically, the next step of the method is for the computer-implemented algorithm to determine one or more suitable changes in the environment of the person in order to enhance the well-being of said person. The suitable changes will preferably depend on the time of day/night and normal schedules for activities like meals, rest and sleeping periods (e.g. calming at night and possibly activating after long periods of inactivity in the daytime). Thus, the environment is optimized in this step for the purpose of increasing the well-being. The alterations of the environment should preferably stimulate the person, e.g. for calming the person, and may include changing any of the following: brightness and/or colour of lights, images/videos on displays, projected images, sound (e.g. music, ambient sound or voice messages) from speakers, scents, or combinations thereof. Some of the changes may be automatically initiated as a result of the assessment of the person's well-being, or at specific times during the daily cycle, or at specific predefines times e.g. scheduled events (bedtime, dinner, visits, excursions, etc.). As an example, the lighting of the environment may reflect the circadian cycle or a diurnal cycle. For instance, the lights may be warm in the morning to imitate a rising sun and dimmed in the evening to imitate a sunset. The changing lights may be accompanied by changes in projected images and/or sounds in the environment, e.g. the sounds of chirping birds, waves, or other pleasant sounds. The environment may comprise a number of electronic devices or systems that may be operated as part of the presently disclosed method. These systems include lighting systems, temperature control systems, aroma systems, audio systems, AV systems, and other systems. Accordingly, there are numerous possibilities for creating a customized environment. The environment should preferably be a personalized environment, which is of particular importance in case of a dementia patient. In the latter case, the environment may be a room in a nursing home or an assisted living facility, which have been altered to create a more personalized environment. It may also be a stimulation room, a sensory room, or a controlled multisensory environment. The presently disclosed method allows for such a room/environment to be dynamically and automatically adapted in response to real-time data of a person situated in the room/environment.

Examples of Personal Data Stored in the Database

The environment may be customized/changed using personal digital content stored in a database. Family members and friends may preferably have permission to upload personal content to said database. The data may comprise generic data, nature sounds, images, video, calming music, music designed to follow the daily rhythm, and more. The data may also relate to a particular time-period and/or places that are relevant to the life of the person. Examples include music from the person's youth, images and video from nearby locations, and/or images and videos depicting objects from their youth. It may also include voice and video recordings of relatives from family gatherings, personal videos from vacations, nature experiences, images, sound and videos of rooms and objects from previous residences. The data may be used directly or used to determine primary colours in preferred rooms to recreate a familiar colour scheme. The data may further include images/videos of a view from a favourite window preferably showing diurnal changes on different days. This data can be used to create an artificial window. The data may also include sounds from the previous residence, faint traffic noise, clock ticking, sounds from the garden, birds, wind in the trees, raindrops on windows, etc.

Adapting the Environment

Once the machine learning algorithm (or neural network) has decided on a number of suitable changes of the environment, the next step of the method is to implement the changes in the environment. This may be done automatically by transmitting instructions to the relevant electronic devices, or it may be done manually e.g. based on suggestions from the system. The instructions may be any combination of instructions to a number of different devices, or it may be a single instruction. Examples of instructions include: initiate the playback of music or sound on speakers placed in the environment, pull back the curtains from the windows (may be done electrically), release a certain fragrance, initiate the playback of a digital collection comprising photos or videos, or combinations thereof. Examples of digital collections are given in a previous section. The instructions may also be transmitted to the devices via the remote control described in the first aspect. Once the changes have been implemented in the environment, the method may be repeated. It may also run continuously for a given period of time, wherein the person is constantly monitored and the machine learning algorithm is provided with input comprising real-time data of the person (e.g. providing feedback on the response of the person to said changes in the environment). Hence, the steps of the method may be repeated any number of times until an optimized environment is reached or the system is shut down manually.

Accordingly, the present disclosure relates to a method for adapting the environment of a person, the method comprising the steps of obtaining data of the person situated in the environment, analysing said data using a machine learning algorithm in order to assess the well-being of the person, wherein said assessment is based on a set of quantifiable measures extracted from the data, determining on the basis of said quantifiable measures a suitable change in the environment in order to enhance the well-being of the person, changing one or more elements within the environment, optionally repeating any of the above steps until the well-being of the person is maximized as a result of the adapted environment. The data may preferably be obtained using a non-intrusive sensor-system comprising at least one wearable sensor worn by the person and at least one room sensor located in the environment.

Further Details of the Invention

The following list of items should not be construed as claims.
1. A remote control comprising:
    a housing comprising a plurality of surfaces,
    at least one sensor for detecting the orientation of the housing, movements of the housing, and/or combinations thereof,
    at least one communication unit for wirelessly communicating with an electronic device and/or one or more output devices,
    wherein the remote control is configured such that a predefined movement and/or orientation of the remote control is associated with a predefined command transmitted via the communication unit, and wherein a plurality of the surfaces are configured for controlling digital content on said one or more output devices, such that each of said surfaces is associated with a predefined selection of digital content on said output device(s).
2. A remote control comprising:
    a housing comprising:
    a plurality of surfaces, wherein a subset of said surfaces are configured as output surfaces for controlling digital content on one or more output devices, each of said output surfaces being associated with a predefined selection of digital content on said one or more output devices;
    at least one sensor for detecting the orientation of the remote control, movements of the remote control, and/or combinations thereof;
    at least one processing unit embedded in the housing, said processing unit configured for processing data from the sensor;
    at least one communication unit embedded in the housing, said communication unit configured for wirelessly communicating with an electronic device and/or one or more output devices, wherein the remote control is configured such that a predefined movement and/or orientation of the remote control is associated with a predefined command transmitted via the communication unit.
3. The remote control according to any of the preceding items, wherein the housing has a polyhedron shape.
4. The remote control according to any of the preceding items, wherein the remote control comprises one or more static image(s) provided on a plate or a paper.
5. The remote control according to any of the preceding items, wherein the remote control comprises one or more static image(s) removably attached to the housing.
6. The remote control according to any of the preceding items, wherein the remote control comprises one or more static image(s) removably attached to one or more output surfaces of the housing, said image(s) representing a selection of the digital content associated with the output surface on which it is provided.
7. The remote control according to any of the preceding items, wherein one or more of the static image(s) are provided on a transparent or semi-transparent plate.
8. The remote control according to any of the preceding items, wherein one or more light sources are embedded in the housing, said light sources being configured for, in use, transmitting light through one or more of the output surfaces.
9. The remote control according to item 8, wherein the light source(s) are configured for illuminating one or more of the static images.
10. The remote control according to any of the items 4-9, wherein the static images are attached by use of any of the following: magnets, hook-and-loop fasteners, or by a frame provided on the housing.
11. The remote control according to any of the items 4-9, wherein the housing comprises a frame arranged on one or more of said output surfaces, the frame configured for receiving the static image(s), such that the static image(s) are removably attached to the housing.
12. The remote control according to any of the items 4-9, wherein the housing comprises a frame arranged on one or more of said output surfaces, the frame configured for receiving a plate and/or a printed image, such that the plate and/or the printed image can be removably attached to the housing.
13. The remote control according to any of the items 11-12, wherein the frame is configured for receiving the static image(s) either by a sliding motion wherein the static image(s) are slid into the frame, or by a snapping motion wherein the static image(s) are pressed into the frame.
14. The remote control according to any of the items 11-13, wherein the frame is arranged on each of the output surfaces.
15. The remote control according to any of the preceding items, wherein the housing comprises a frame arranged on one or more of said output surfaces, each frame configured for receiving a plate and/or a printed image, such that the plate and/or the printed image is replaceable.
16. The remote control according to any of the preceding items, wherein each of the output surfaces is provided with a frame configured for holding a plate and/or a printed image, such that the plate and/or the printed image is removably attached to the housing via the frame.
17. The remote control according to any of the preceding items, wherein at least one of the surfaces is recessed in the housing.
18. The remote control according to item 17, wherein the remote control is configured for pausing an ongoing presentation on the output device, in case the recessed surface is oriented in a predefined direction.
19. The remote control according to any of the items 17-18, wherein the remote control comprises a button attached in the recessed surface.
20. The remote control according to item 19, wherein the button comprises a knob and/or a push-button.
21. The remote control according to any of the items 19-20, wherein a user operating the remote control can grade the digital content by pressing the button.
22. The remote control according to any of the preceding items, wherein a user may initiate a specific selection of digital content on the output device(s) by orienting one of the output surfaces in a predefined direction.
23. The remote control according to of the preceding items, wherein a user may initiate a presentation comprising a specific selection of digital content on the output device(s) by orienting an output surface in a predefined direction detectable by the at least one sensor.

24. The remote control according to any of the preceding items, wherein the surfaces of the housing are flat polygonal surfaces such that the geometry of the remote control resembles a polyhedron.
25. The remote control according to any of the preceding items, wherein the geometry of the remote control resembles a platonic solid.
26. The remote control according to any of the preceding items, wherein the geometry of the remote control resembles a cube.
27. The remote control according to any of the preceding items, wherein the housing of the remote control comprises an even number of surfaces, wherein each surface has an opposing parallel surface.
28. The remote control according to any of the preceding items, wherein each of the output surfaces is provided with one or more illustrations representing a selection of said digital content.
29. The remote control according to item 28, wherein said illustration(s) are selected among the group of: images, symbols, texts, and/or combinations thereof.
30. The remote control according to any of the preceding items, wherein the digital content may be discontinued by orienting a specific surface of the remote control in a predefined direction.
31. The remote control according to any of the preceding items, wherein at least one of the surfaces of the remote control is configured for, in use, setting the output device in a standby mode or shutting it off, when said surface is oriented in a predefined direction.
32. The remote control according to any of the items 30-31, wherein the surface capable of stopping the playing of the digital content is provided with a standby symbol (IEC 60417-5009).
33. The remote control according to any of the preceding items, wherein the digital content comprises a collection of images, a presentation, a video, a piece of music, a sound, and/or combinations thereof.
34. The remote control according to any of the preceding items, wherein the output device(s) are selected among the group of: displays, screens, monitors, speakers, sound systems, lighting systems, and/or combinations thereof.
35. The remote control according to any of the preceding items, wherein the at least one sensor is selected from the group of tilt sensors, accelerometers, gyroscopes, or magnetometers.
36. The remote control according to any of the preceding items, wherein the at least one sensor comprises a gyroscope and/or an accelerometer.
37. The remote control according to any of the preceding items, wherein the wireless communication of the remote control is selected among the group of: Bluetooth, Bluetooth Low Energy (BLE), Wi-Fi, 4G, 5G, or GSM.
38. The remote control according to any of the preceding items, wherein an electronic display is integrated in at least one of the output surfaces of the remote control.
39. The remote control according to item 38, wherein the screen is an E Ink display.
40. The remote control according to any of the items 38-39, wherein the display is used to display an image representing a specific piece of digital content.
41. The remote control according to item 40, wherein the representative image on the screen changes dynamically over time.
42. The remote control according to any of the preceding items, wherein the remote control is configured for wirelessly identifying a nearby broadcasting device.
43. The remote control according to item 42, wherein the identification is performed using Bluetooth or Bluetooth Low Energy (BLE).
44. The remote control according to any of the items 42-43, wherein the broadcasting device is a personal electronic tag such as an iBeacon.
45. The remote control according to any of the items 42-44, wherein the remote control comprises at least one electronic display integrated in at least one of the output surfaces of the remote control, and wherein said display is configured for displaying one or more representative images of a piece of digital content.
46. The remote control according to item 45, wherein the images displayed on the display is associated with a personal electronic tag, and wherein the images automatically changes in response to identifying a new nearby tag.
47. The remote control according to any of the preceding items, wherein the remote control is configured for detecting one or more actions performed by a user.
48. The remote control according to item 47, wherein the one or more actions are selected among the group of: rotating the device around different axes, moving the device along an axis, pushing the device, tapping an output surface of the device, shaking the device, flipping the device, and/or combinations thereof.
49. The remote control according to any of the items 47-48, wherein the handling of the remote control is analysed using pattern recognition and/or artificial intelligence.
50. The remote control according to any of the items 47-49, wherein the performed action is confirmed by providing feedback to the user.
51. The remote control according to item 50, wherein the feedback is selected among the group of: illumination of one or more surfaces of the remote control, flashing lights, vibration, sound(s), and/or combinations thereof.
52. The remote control according to any of the preceding items, wherein the remote control is wirelessly linked to the one or more output devices via an electronic device.
53. The remote control according to item 52, wherein the electronic device is a computing device, such as a tablet, a smartphone, a computer, or similar.
54. The remote control according to any of the preceding items, wherein the digital content associated with the surfaces of the remote control comprises personal content uniquely paired to a specific remote control.
55. The remote control according to item 54, wherein the digital content is stored in a database, said database storing personal data of a plurality of individuals.
56. The remote control according to item 55, wherein relatives may upload personal content to the database, wherein said content may be retrieved at a later point in time using the remote control according to any of the items 54-55.
57. A system configured for controlling digital content on an output device, said system comprising:
   a) a remote control according to any of the items 1-19; and
   b) an electronic device comprising:
      a communication module configured for wireless communication with the remote control via the communication unit of the remote control; and
      a first interface(s) configured to connect the output device to the electronic device.
58. The system according to item 57, wherein the system further comprises an output device for displaying the digital content, wherein said output device is connected to the electronic device via the first interface.
59. The system according to any of the items 57-58, wherein the electronic device further comprises a processing unit.

60. The system according to any of the items 57-59, wherein the electronic device further comprises a second interface configured to connect a modem for connecting the electronic device to a cellular network such as 4G.

61. The system according to any of the items 57-60, wherein the electronic device is a single board computer.

62. The system according to any of the items 57-61, wherein the electronic device is configured for decrypting data received from a database, said database storing the digital content (such as images) in encrypted form.

63. The system according to any of the items 57-62, wherein the electronic device is configured for creating a presentation comprising the digital content, said digital content comprising one or more images.

64. The system according to item 63, wherein the electronic device is configured for automatically changing the presentation and/or creating a new presentation based on analysing the usage of the remote control.

65. The system according to any of the items 57-64, wherein the electronic device is configured for using machine learning to characterize the images, said characterization being based on the content of the images, e.g. the presence of human beings in the images.

66. The system according to any of the items 57-65, wherein the electronic device is configured for adding one or more effects to the presentation, said effects belonging to the group of: transitions between the images, background music, sound effects, animations, or similar, based on the characterization.

67. The system according to item 66, wherein the one or more effects are added automatically by the electronic device using machine learning.

68. The system according to any of the items 57-67, said system further comprising a database storing the digital content (such as images) in encrypted form, said database being configured for wirelessly transmitting said digital content to the electronic device.

69. The system according to any of the items 57-68, said system further comprising a software application executable on a remote device such as a mobile phone, the software application configured for executing the steps of:
    a) uploading by a user digital content to a remote server such as a cloud-based database; and/or
    b) selecting by a user digital content available on said remote server;
    c) creating by a user a collection of digital content comprising the uploaded content and/or the selected content.

70. A method of displaying digital content on one or more output devices, said method comprising the steps of:
    a) Selecting by a user the digital content by orienting one of the output surfaces of the remote control according to any of the items 1-56 in a predefined direction such as upwards;
    b) Identifying by the remote control the selected output surface and the digital content associated with said output surface;
    c) Transmitting via the remote control, instructions for initiating the selected digital content on one or more output devices, said instructions being transmitted to an electronic device;
    d) Receiving and interpreting said instructions by the electronic device; and
    e) Displaying the digital content on the one or more output devices.

71. The method according to item 70, wherein a user can grade the digital content by pushing the button of the remote control and/or by tapping the output surface associated with the displayed digital content.

72. The method according to any of the items 70-71, wherein the electronic device and the output device forms part of the system according to any of the items 57-69.

73. A method for controlling one or more output devices in the environment of a person, said method comprising the steps of:
    a) Receiving by the remote control according to any of items 1-56 an input from a user;
    b) Transmitting via the remote control a command associated with said input to an electronic device;
    c) Receiving and interpreting said command by the electronic device;
    d) Implementing a predetermined setting of one or more output devices within the environment based on the interpreted command;
    e) Optionally repeating any of the steps a)-e).

74. The method according to item 73, wherein the user input is selected among the group of: rotating the remote control around different axes, moving the remote control along an axis, pushing the remote control, tapping a surface of the remote control, shaking the remote control, flipping the remote control, or combinations thereof.

75. The method according to any of the items 73-74, wherein the electronic device is a bridge unit configured for receiving and interpreting commands from the remote control.

76. The method according to item 75, wherein the bridge unit is further configured for communicating with the one or more output devices.

77. The method according to item 76, wherein the one or more output devices are selected among the group of: displays, sound systems, aroma systems, lighting systems, or temperature control systems.

The invention claimed is:

1. A remote control comprising:
    a housing comprising a plurality of surfaces, wherein a subset of said surfaces are configured as output surfaces for controlling digital content on one or more output devices, each of said output surfaces being associated with a predefined selection of digital content on said output device(s);
    one or more static image(s) representing a selection of the digital content associated with the output surface on which it is provided;
    at least one sensor for detecting an orientation of the remote control, movements of the remote control, and/or combinations thereof;
    at least one processing unit embedded in the housing, said processing unit configured for processing data from the sensor; and
    at least one communication unit embedded in the housing, said communication unit configured for wireless communication with an electronic device and/or the one or more output devices;
    wherein the remote control is configured such that a predefined movement and/or orientation of the remote control is associated with a predefined command transmitted via the communication unit;
    wherein the remote control is further configured to initiate, upon the orientation of one of the output surfaces in a predefined direction, a playback of the digital content associated with the image of the output surface on the output device(s);

wherein the one or more static images(s) are removably attached to each of the one of more output surfaces of the housing, wherein the static image(s) are attached by use of any of the following: magnets, hook-and-loop fasteners, or by a frame provided on the housing; and wherein the remote control is further reconfigurable such that the output surfaces can be associated with new digital content.

2. The remote control according to claim 1, wherein one or more of the static image(s) are provided on a plate or a paper.

3. The remote control according to claim 1, wherein one or more of the static image(s) are provided on a transparent or semi-transparent plate.

4. The remote control according to claim 1, wherein the housing comprises a frame arranged on one or more of said output surfaces, the frame configured for receiving the static image(s), such that the static image(s) can be removably attached to the housing.

5. The remote control according to claim 4, wherein the frame is configured for receiving the static image(s) either by a sliding motion wherein the static image(s) are slid into the frame, or by a snapping motion wherein the static image(s) are pressed into the frame.

6. The remote control according to claim 1, wherein at least one of the surfaces is recessed in the housing.

7. The remote control according to claim 6, wherein the remote control is configured for pausing an ongoing presentation on the output device, in case the recessed surface is oriented in a predefined direction.

8. The remote control according to claim 6, wherein the remote control comprises a button attached in the recessed surface.

9. The remote control according to claim 8, wherein the button comprises a knob and/or a push-button.

10. The remote control according to claim 1, wherein at least one of the surfaces of the remote control is configured for, in use, setting the output device in a standby mode or shutting it off, when said surface is oriented in a predefined direction.

11. The remote control according to claim 1, wherein the remote control is configured for controlling the one or more output devices via an electronic device, wherein said electronic device is a computing device such as a computer, a tablet, or a smartphone.

12. A system configured for controlling digital content on an output device, said system comprising:
a remote control according to claim 1; and
an electronic device comprising:
a communication module configured for wireless communication with the remote control via the communication unit of the remote control; and
a first interface(s) configured to connect the output device to the electronic device.

13. The system according to claim 12, wherein the electronic device further comprises a processing unit.

14. The system according to claim 12, wherein the electronic device further comprises a second interface configured to connect a modem for connecting the electronic device to a cellular network such as 4G.

15. The system according to claim 12, wherein the electronic device is a single board computer.

16. The system according to claim 12, wherein the electronic device is configured for creating a presentation comprising the digital content, said digital content comprising one or more images.

17. The system according to claim 16, wherein the electronic device is configured for automatically changing the presentation and/or creating a new presentation based on analysing usage of the remote control.

18. The system according to claim 12, said system further comprising a database storing the digital content (such as images) in encrypted form, said database being configured for wirelessly transmitting said digital content to the electronic device.

19. The system according to claim 12, said system further comprising a software application executable on a remote device such as a mobile phone, the software application configured for executing the steps of:
uploading by a user digital content to a database, such as a cloud-based database, and/or selecting by a user digital content available on said database; and
creating by a user a collection of digital content comprising the uploaded content and/or the selected content.

* * * * *